(12) United States Patent
Yamauchi et al.

(10) Patent No.: US 8,564,719 B2
(45) Date of Patent: Oct. 22, 2013

(54) INFORMATION PROCESSING APPARATUS, INFORMATION PROCESSING METHOD, AND INFORMATION PROCESSING PROGRAM

(75) Inventors: Toshiyuki Yamauchi, Tokyo (JP); Nobutoshi Shida, Tokyo (JP); Hiroshi Kanma, Kanagawa (JP)

(73) Assignee: Sony Corporation, Tokyo (JP)

( * ) Notice: Subject to any disclaimer, the term of this patent is extended or adjusted under 35 U.S.C. 154(b) by 569 days.

(21) Appl. No.: 12/418,918

(22) Filed: Apr. 6, 2009

(65) Prior Publication Data

US 2009/0251598 A1    Oct. 8, 2009

(30) Foreign Application Priority Data

Apr. 8, 2008  (JP) ................................. 2008-100451

(51) Int. Cl.
- *H04N 7/01* (2006.01)
- *H04N 11/20* (2006.01)
- *H04N 5/46* (2006.01)

(52) U.S. Cl.
USPC ........... 348/448; 348/441; 348/443; 348/452; 348/458; 348/459; 348/558

(58) Field of Classification Search
USPC .................. 348/443, 448, 452, 458, 459, 558
See application file for complete search history.

(56) References Cited

U.S. PATENT DOCUMENTS

| | | | | |
|---|---|---|---|---|
| 5,398,071 A | * | 3/1995 | Gove et al. ..................... | 348/558 |
| 5,734,435 A | * | 3/1998 | Wilson et al. .................. | 348/459 |
| 6,041,142 A | * | 3/2000 | Rao et al. ..................... | 382/232 |
| 6,111,610 A | * | 8/2000 | Faroudja ....................... | 348/441 |
| 6,222,589 B1 | * | 4/2001 | Faroudja et al. .............. | 348/448 |
| 6,262,763 B1 | * | 7/2001 | Totsuka et al. ................ | 348/135 |
| 6,480,232 B1 | * | 11/2002 | Wilson et al. ................. | 348/459 |
| 6,597,402 B1 | * | 7/2003 | Butler et al. .................. | 348/447 |
| 6,670,996 B2 | * | 12/2003 | Jiang ............................. | 348/558 |
| 6,714,253 B2 | * | 3/2004 | Kim et al. ..................... | 348/556 |
| 7,075,581 B1 | * | 7/2006 | Ozgen et al. .................. | 348/448 |
| 7,082,161 B2 | * | 7/2006 | Sumiyoshi et al. ...... | 375/240.01 |
| 7,116,828 B2 | * | 10/2006 | Wells ............................ | 382/233 |
| 7,158,186 B2 | * | 1/2007 | Selby et al. ................... | 348/459 |
| 7,224,404 B2 | * | 5/2007 | An et al. ....................... | 348/584 |
| 7,420,616 B2 | * | 9/2008 | Linzer et al. ................. | 348/441 |

(Continued)

FOREIGN PATENT DOCUMENTS

| | | |
|---|---|---|
| JP | 11-088845 | 3/1999 |
| JP | 2001-218172 A | 8/2001 |
| JP | 2002-094949 A | 3/2002 |
| JP | 2008-060767 A | 3/2008 |

*Primary Examiner* — Brian Yenke
(74) *Attorney, Agent, or Firm* — Wolf, Greenfield & Sacks, P.C.

(57) ABSTRACT

An information processing apparatus that has a frame buffer that stores an input video signal, that loads a video signal at an asynchronous timing with the video signal input from the frame buffer and then that I/P-converts the loaded video signal from an interlaced signal into a progressive signal includes: pulldown determination means that determines whether the input video signal is subjected to a process of skipping or repeating a source video signal through a pulldown process; and control means that, when it is determined that the input video signal is subjected to the process of skipping or repeating, controls a process of skipping or repeating the loaded video signal to obtain a pulldown pattern supported at an I/P conversion side at which the I/P-conversion is performed, when the loaded video signal is converted from an interlaced signal into a progressive signal.

12 Claims, 17 Drawing Sheets

(56) References Cited

U.S. PATENT DOCUMENTS

| | | | |
|---|---|---|---|
| 7,738,045 B2* | 6/2010 | Doswald et al. | 348/701 |
| 7,800,692 B2* | 9/2010 | Wredenhagen et al. | 348/449 |
| 7,961,253 B2* | 6/2011 | Jen | 348/448 |
| 2002/0130970 A1* | 9/2002 | Jiang | 348/459 |
| 2002/0136540 A1* | 9/2002 | Adams et al. | 386/125 |
| 2002/0171758 A1* | 11/2002 | Kondo et al. | 348/441 |
| 2004/0090556 A1* | 5/2004 | Kamieniecki et al. | 348/558 |
| 2005/0190297 A1* | 9/2005 | Kawata | 348/569 |
| 2007/0052846 A1* | 3/2007 | Adams | 348/452 |
| 2007/0103589 A1* | 5/2007 | Tanaka | 348/448 |
| 2007/0252894 A1* | 11/2007 | Satou et al. | 348/97 |
| 2007/0291169 A1* | 12/2007 | Eymard et al. | 348/452 |
| 2007/0296858 A1* | 12/2007 | Eymard et al. | 348/456 |
| 2008/0062308 A1* | 3/2008 | Zhai et al. | 348/448 |
| 2008/0151103 A1* | 6/2008 | Asamura et al. | 348/448 |
| 2008/0158414 A1* | 7/2008 | Capps | 348/448 |
| 2009/0161766 A1* | 6/2009 | Bronstein et al. | 375/240.23 |
| 2009/0237557 A1* | 9/2009 | Winger | 348/448 |
| 2009/0322886 A1* | 12/2009 | Tokutomi | 348/180 |
| 2011/0001875 A1* | 1/2011 | Nakayama | 348/448 |

\* cited by examiner

//www.w3.org/1999/xhtml
INFORMATION PROCESSING APPARATUS, INFORMATION PROCESSING METHOD, AND INFORMATION PROCESSING PROGRAM

BACKGROUND OF THE INVENTION

1. Field of the Invention

The invention relates to an information processing apparatus, information processing method and information processing program and, more particularly, to an information processing apparatus, information processing method and information processing program that are able to convert an interlaced video signal into a progressive video signal with less degradation.

2. Description of the Related Art

As shown in FIG. 1, for example, in a front end that includes a decoder, when it is desirable to decode an encoded 60 Hz video signal and then output the decoded 60 Hz video signal from the front end as a 59.94 Hz video signal, it may be necessary to convert a frame rate in the front end. One of frame rate conversion methods includes a method in which a frame or field in a specific place of the decoded picture is skipped. For example, when a 60 Hz video signal is converted into a 59.94 Hz video signal, there is a method in which a 60 Hz decoded picture is skipped one frame for about every 1001 frames and thus converted into a frame rate of 59.94 Hz for output (60*1000/1001≈59.94).

In FIG. 1, a 3:2 pulldown process is performed on a 24p signal to obtain a 3:2 pulldown signal (60i signal). When the 3:2 pulldown signal is converted into a 59.94i signal, two frames (fields) shown by video signals D indicated by "Skip" in the drawing are skipped to achieve frame rate conversion.

On the other hand, as shown in FIG. 2, for example, in a front end that includes a decoder, when it is desired to decode an encoded 59.94 Hz video signal and then output the decoded 59.94 Hz video signal from the front end as a 60 Hz video signal, it may be necessary to convert a frame rate in the front end. One of frame rate conversion methods include a method in which a frame or field in a specific place of the decoded picture is repeated. For example, when a 59.94 Hz video signal is converted into a 60 Hz video signal, there is a method in which a 59.94 Hz decoded picture is repeated one frame for about every 1000 frames and thus converted into a frame rate of 60 Hz for output (59.94*1001/1000≈60).

In FIG. 2, a 3:2 pulldown process is performed on a 23.976p signal to obtain a 3:2 pulldown signal (59.94i signal). When the 3:2 pulldown signal is converted into a 60i signal, frames shown by video signals C and D indicated by "Repeat" in the drawing are repeated to achieve frame rate conversion.

Incidentally, as shown in FIG. 3, when the 3:2 pulldown signal (59.94i signal) obtained by performing the pulldown process on the 23.976p signal is converted into a progressive signal, because skipping or repeating due to frame rate conversion, or the like is not performed, I/P (Interlace/Progressive) conversion provides a 59.94p signal, which is a complete progressive signal.

An existing technique related to the progressive conversion, for example, includes a technique described in Japanese Unexamined Patent Application Publication No. 11-88845.

SUMMARY OF THE INVENTION

In the existing technique that includes JP-A-11-88845, skipping or repeating may be necessary because of the frame rate conversion, or the like; however, when skipping or repeating is performed without taking into consideration I/P conversion, a pulldown sequence collapses at portions at which frames are skipped or repeated. Thus, there is a problem that a converted progressive picture mixedly includes fields having different capturing times.

For example, as shown in FIG. 4, when a 3:2 pulldown signal (59.94i signal), which is obtained by performing a pulldown process on a 23.976p signal, is converted into a 60i signal, frames shown by video signals A and B indicated by "Repeat" in the drawing may be repeated for frame rate conversion. After that, the 60i signal obtained through the frame rate conversion is I/P converted to obtain a 60p signal, which is a progressive signal; however, as shown by the frames indicated by video signals B', A', B', B' of the 60p signal in FIG. 4, a pulldown sequence collapses in a range in which the frames indicated by the video signals A and B are repeated.

As a result, signals in the range in which the pulldown sequence collapses are not pulldown signals and, therefore, they are predictively interpolated from the fields. This causes a converted progressive picture to mixedly include fields having different capturing times and, as a result, it is difficult to generate a complete progressive picture.

It is desirable to be able to perform I/P conversion with less degradation.

According to an embodiment of the invention, there is provided an information processing apparatus having a frame buffer that stores an input video signal, wherein the information processing apparatus loads a video signal at an asynchronous timing with the video signal input from the frame buffer and then I/P-converts the loaded video signal from an interlaced signal into a progressive signal, the information processing apparatus includes: pulldown determination means that determines whether the input video signal is subjected to a process of skipping or repeating a source video signal through a pulldown process; and control means that, when it is determined that the input video signal is subjected to the process of skipping or repeating, controls a process of skipping or repeating the loaded video signal to obtain a pulldown pattern supported at an I/P conversion side at which the I/P-conversion is performed, when the loaded video signal is converted from an interlaced signal into a progressive signal.

The information processing apparatus may further include matching means that executes matching between all pulldown patterns, into which the input video signal can be converted by skipping or repeating a pulldown pattern of the input video signal, and pulldown patterns supported by the I/P conversion side, and the control means may control the process of skipping or repeating the loaded video signal on the basis of the result of the matching.

The result of the matching may include a case in which only one pattern matches, a case in which multiple patterns match, and a case in which none of patterns match, and the information processing apparatus may further include selection means that selects a pattern of skipping or repeating corresponding to the result of the matching.

The selection means, when only one pattern matches as the result of the matching, may select the only one pattern as a pattern of skipping or repeating.

The selection means, when multiple patterns match as the result of the matching, may select a predetermined pattern that is defined beforehand from among the matched multiple patterns as a pattern of skipping or repeating.

The selection means, when none of patterns match as the result of the matching, may select a predetermined pattern that is defined beforehand from among all pulldown patterns, into which the input video signal can be converted by skipping or repeating a pulldown pattern of the input video signal, as a pattern of skipping or repeating.

The information processing apparatus may further include timing determination means that determines whether it is a timing at which the process of skipping or repeating is executed on the loaded video signal, and the control means, when it is determined that it is the timing at which the process of skipping or repeating is executed on the loaded video signal, may execute the process of skipping or repeating on the loaded video signal.

The pulldown determination means may determine, on the basis of pulldown information from the I/P conversion side, whether the pulldown process is executed on the input video signal.

According to an embodiment of the invention, an information processing method for an information processing apparatus having a frame buffer that stores an input video signal, wherein the information processing apparatus loads a video signal at an asynchronous timing with the video signal input from the frame buffer and then I/P-converts the loaded video signal from an interlaced signal into a progressive signal, the information processing method includes: determining whether the input video signal is subjected to a process of skipping or repeating a source video signal through a pulldown process; and when it is determined that the input video signal is subjected to the process of skipping or repeating, controlling a process of skipping or repeating the loaded video signal to obtain a pulldown pattern supported at an I/P conversion side at which the I/P-conversion is performed, when the loaded video signal is converted from an interlaced signal into a progressive signal.

According to an embodiment of the invention, a computer-readable recording medium storing a program that corresponds to the information processing method according to the above described embodiment of the invention.

With the information processing apparatus, information processing method and information processing program of the embodiment of the invention, it is determined whether the input video signal is subjected to a process of skipping or repeating a source video signal through a pulldown process, and when it is determined that the input video signal is subjected to the process of skipping or repeating, a process of skipping or repeating the loaded video signal is controlled to obtain a pulldown pattern supported at an I/P conversion side at which the I/P-conversion is performed, when the loaded video signal is converted from an interlaced signal into a progressive signal.

DESCRIPTION OF THE PREFERRED EMBODIMENTS

Hereinafter, an embodiment of the invention will be described with reference to the accompanying drawings.

Figure 1:
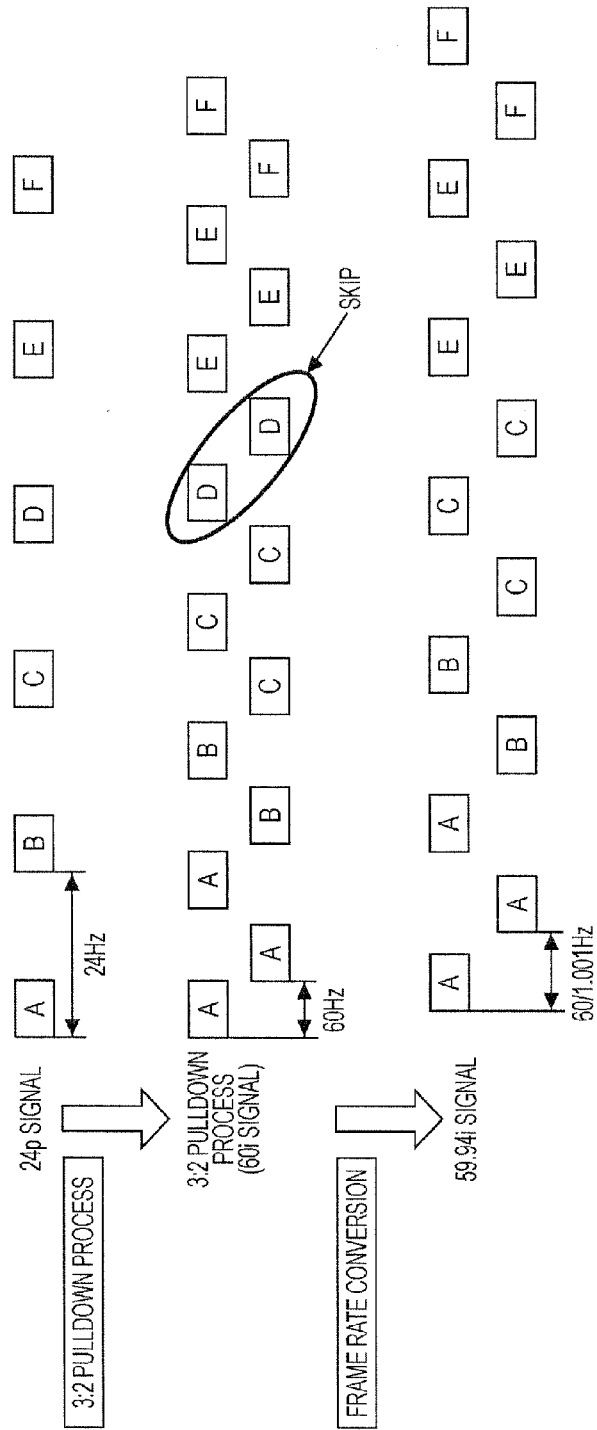
FIG. 1 is a view that illustrates a skip of a frame.
Figure 2:
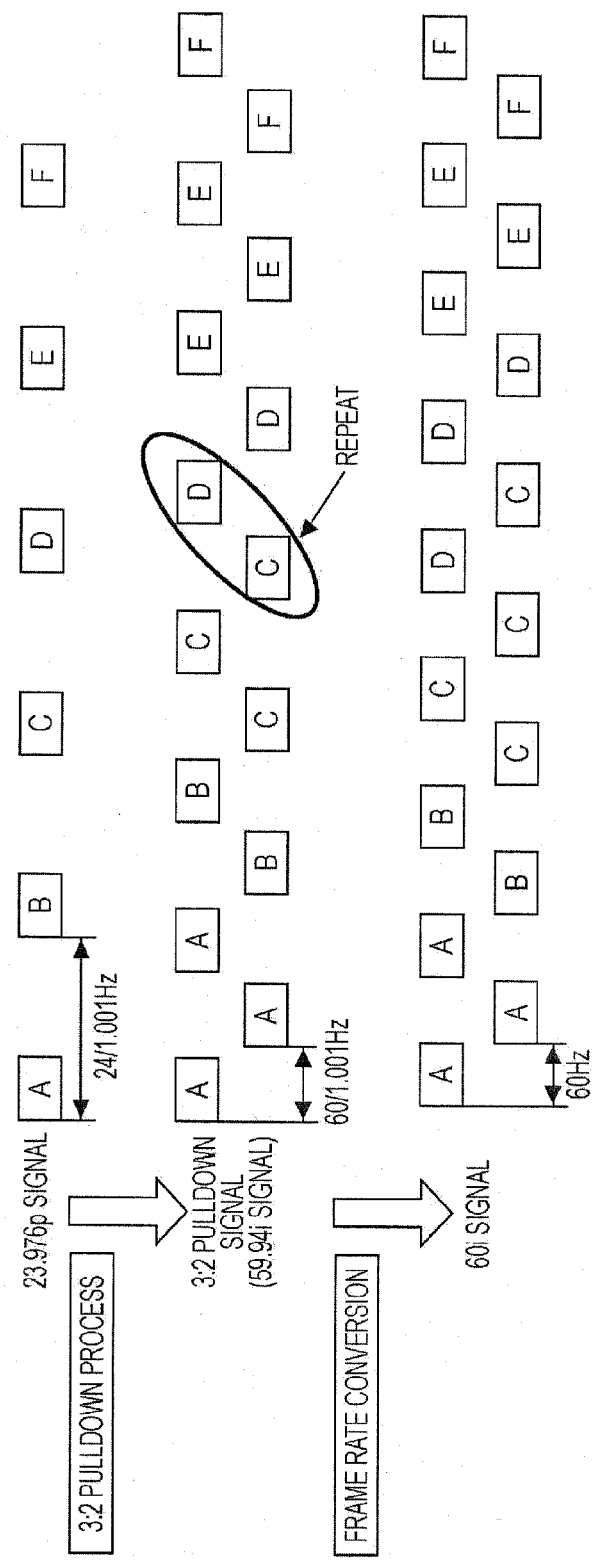
FIG. 2 is a view that illustrates a repeat of a frame.
Figure 3:
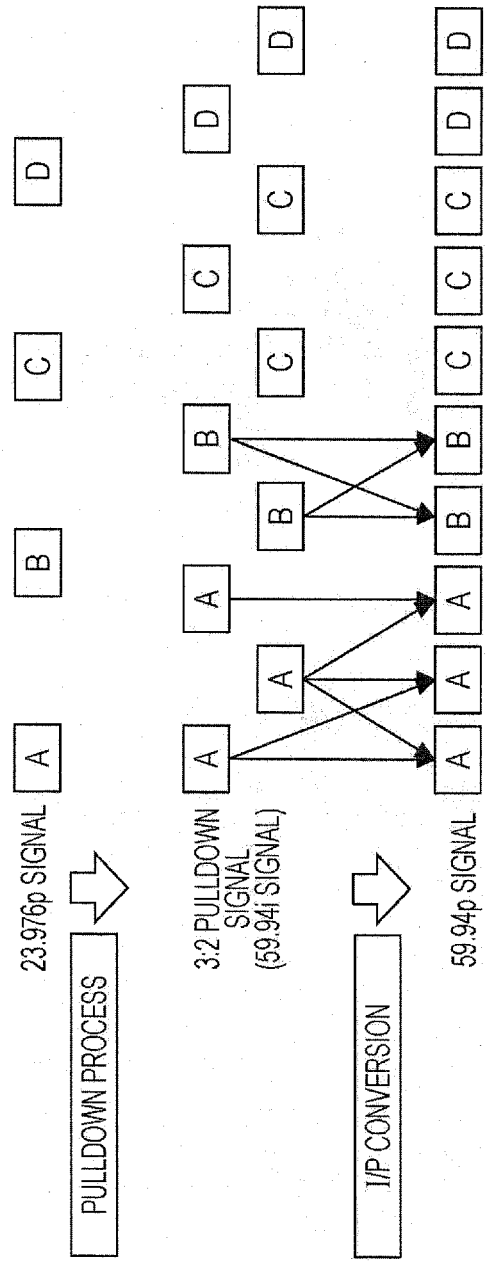
FIG. 3 is a view that illustrates I/P conversion.
Figure 4:
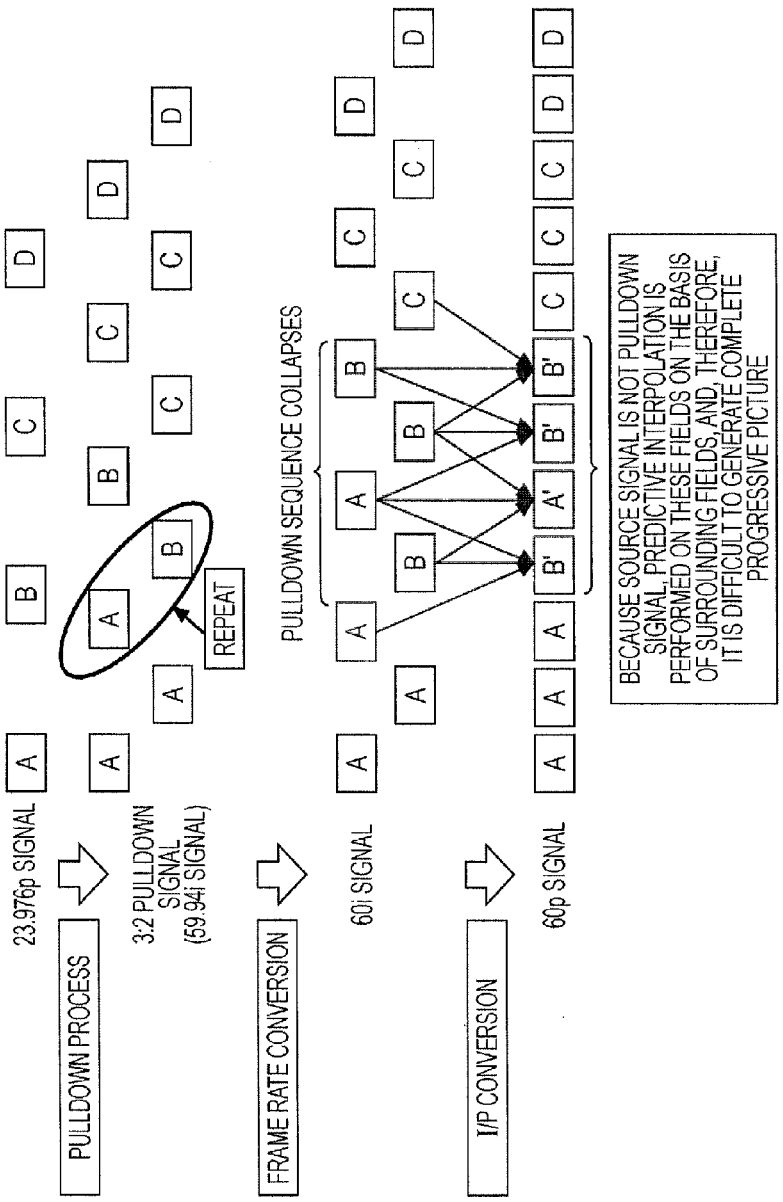
FIG. 4 is a view that illustrates a problem of existing I/P conversion.
Figure 5:
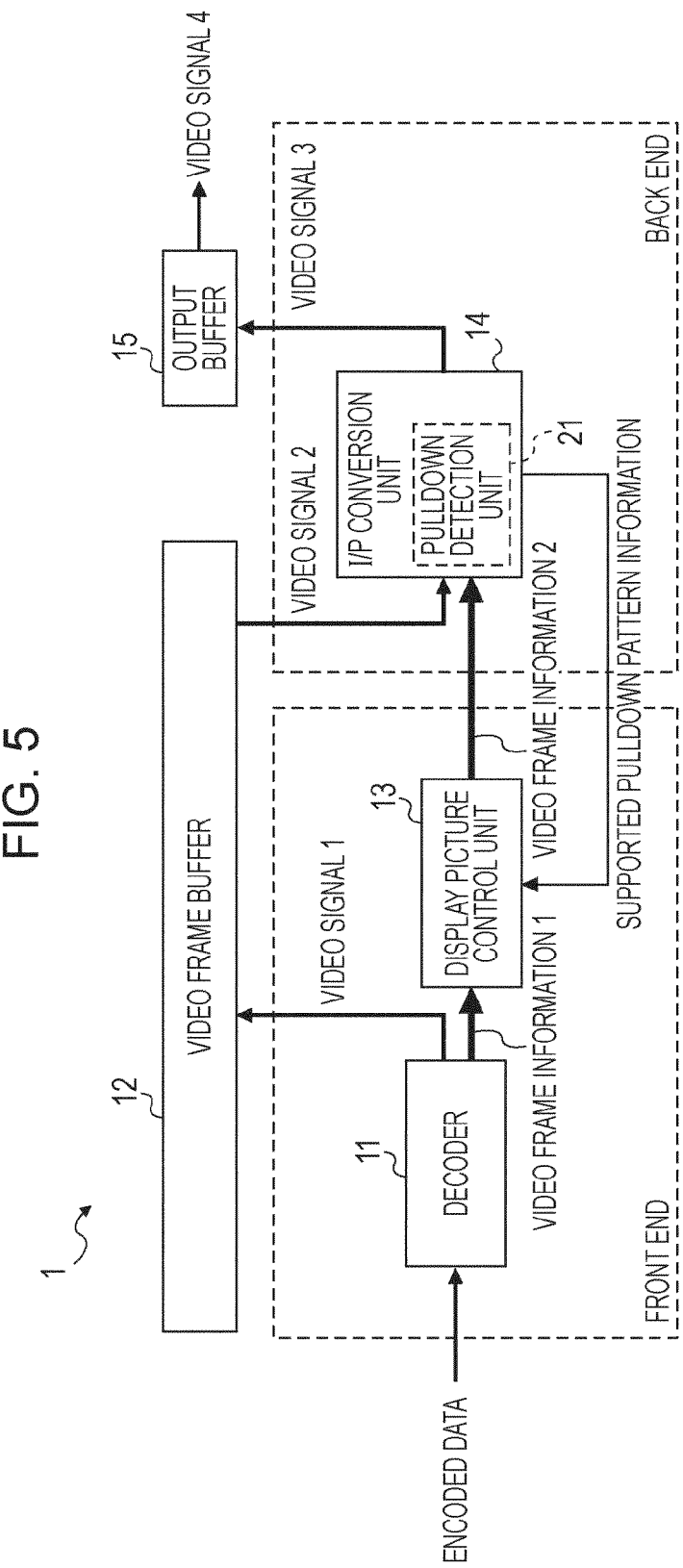
FIG. 5 is a view that shows the configuration of an embodiment of a video signal processing apparatus to which the invention is applied.

FIG. 5 is a view that shows the configuration of an embodiment of a video signal processing apparatus to which the invention is applied.

As shown in FIG. 5, the video signal processing apparatus 1 includes a decoder 11, a video frame buffer 12, a display picture control unit 13, an I/P conversion unit 14 and an output buffer 15. Note that in the present embodiment, as indicated by the areas surrounded by the dotted line in FIG. 5, the decoder 11 and the display picture control unit 13 are collectively referred to as a front end, and the I/P conversion unit 14 that includes a pulldown detection unit 21 is referred to as a back end.

When described in no particular order, the decoder 11 receives encoded data which are obtained by compressing a picture signal. The decoder 11 extracts and analyses picture forming information, which may be necessary for a decoding process, from the received encoded data. Then, the decoder 11 decodes the encoded data into a video signal on the basis of the analysis result of the picture forming information.

In addition, the decoder 11 stores the decoded video signal 1 in the video frame buffer 12, enters the address of the video frame buffer 12 that stores the video signal 1 and portion of the analysis result of the picture forming information as decoded picture information into video frame information 1, and then outputs the video frame information 1 to the display picture control unit 13. Note that the detail of the video frame information 1 will be described later.

The video frame buffer 12 is a buffer (frame memory) that stores the video signal 1 decoded by the decoder 11.

The display picture control unit 13 receives video frame information 1 from the decoder 11 and receives supported pulldown pattern information from the I/P conversion unit 14. The display picture control unit 13 determines a video signal 2 supplied from the video frame buffer 12 to the I/P conversion unit 14 on the basis of the video frame information 1 and the supported pulldown pattern information, and notifies the I/P conversion unit 14 of video frame information 2. Note that the detail of the supported pulldown pattern information will be described later.

The I/P conversion unit 14 acquires the video signal 2, which is a decoded picture decoded by the decoder 11, from the video frame buffer 12 on the basis of the video frame information 2 notified from the display picture control unit 13. The I/P conversion unit 14, when the acquired video signal 2 is an interlaced signal, converts the video signal 2 into a progressive video signal on the basis of the video frame information 2 and a pulldown detected result of the video signal 2, obtained by the pulldown detection unit 21, which will be described later.

Here, the I/P conversion unit 14 is able to recognize a specific pulldown signal, and minimizes picture degradation of the pulldown signal and then converts an interlaced signal into a progressive signal.

In the present embodiment, the pattern of a pulldown signal that can be recognized by the I/P conversion unit 14 and that can be converted into a progressive signal with minimized picture degradation is defined as "pulldown pattern supported by the I/P conversion unit 14", and this corresponds to the supported pulldown pattern information. For example, if the I/P conversion unit 14 is able to recognize a 3:2 pulldown signal and a 2:2 pulldown signal and is able to convert it into a progressive signal with minimized picture degradation, the supported pulldown pattern information is a 3:2 pulldown pattern and a 2:2 pulldown pattern.

In addition, as shown in FIG. 5, the I/P conversion unit 14 includes the pulldown detection unit 21.

The pulldown detection unit 21 analyzes a frame differential signal of the video signal 2 input from the video frame buffer 12 to the I/P conversion unit 14. The pulldown detection unit 21 determines, on the basis of the analysis result, whether the input video signal 2 is a pulldown signal. Then, the pulldown detection unit 21 supplies the pulldown detected result of the video signal 2 to the I/P conversion unit 14.

The progressive video signal converted by the I/P conversion unit 14 is stored in the output buffer 15 as a video signal 3. Then, the video signal 3 stored in the output buffer 15 is output to a following block (not shown) as a video signal 4.

In this way, in the video signal processing apparatus 1 that includes the video frame buffer 12 storing the decoded video signal 1, the I/P conversion unit 14 that operates in accordance with the video frame information 2 from the display picture control unit 13 loads the video signal 2 at an asynchronous timing with the video signal 1 stored in the video frame buffer 12, and the loaded video signal 2 is converted from an interlaced signal into a progressive signal.

Next, the detail of the above described video frame information (hereinafter, when it is not necessary to differentiate between the video frame information 1 and the video frame information 2, they are simply referred to as video frame information) will be described. The video frame information is associated with each video signal and is formed of the following decoded picture information and display picture control information.

The decoded picture information is related to a decoded picture corresponding to a video signal decoded by the decoder 11, and the information of the following (1) to (3), and (6) is included.

(1) Pointer to the video frame buffer 12 that stores the decoded picture (2) I/P information that indicates that the decoded picture is an interlaced picture or a progressive picture (3) Field information that indicates that the decoded picture is a top picture or a bottom picture (6) Information for determining whether the decoded picture is a pulldown signal For example, when MPEG is employed, a progressive_frame, a top_field_first (hereinafter, referred to as TFF), repeat_first_field (hereinafter, referred to as RFF), and the like, correspond to this information.

In addition, the display picture control information is used to control a display picture, and includes the information of the following (4) to (6).

(4) Skip/repeat information that indicates whether it may be necessary to repeatedly display an output picture due to frame rate conversion, or the like, or it may be necessary to skip portion of an output picture (5) Skip/repeat timing information that indicates a timing at which skip or repeat is performed (6) Information of a pulldown pattern field identification number that indicates which number a field of the pulldown pattern is.

Hereinafter, the above (1) to (6) are respectively described by being simply referred to as (1) pointer to the video frame buffer, (2) I/P information, (3) field information, (4) skip/repeat information, (5) skip/repeat timing information, and (6) pulldown information.

Note that in the present embodiment, for the sake of convenience of description, the decoded picture information of (6) and the display picture control information of (6) are collectively referred to as (6) pulldown information. That is, (6) pulldown information, for example, includes a TFF flag, an RFF flag, a pulldown pattern field identification number, and the like.

The video frame information includes the above described (1) pointer to the video frame buffer through (6) pulldown information.

That is, the display picture control unit 13 executes a process to determine the video signal 2 supplied to the I/P conversion unit 14 on the basis of the video frame information 1 and the supported pulldown pattern information supplied from the I/P conversion unit 14.

Figure 6:
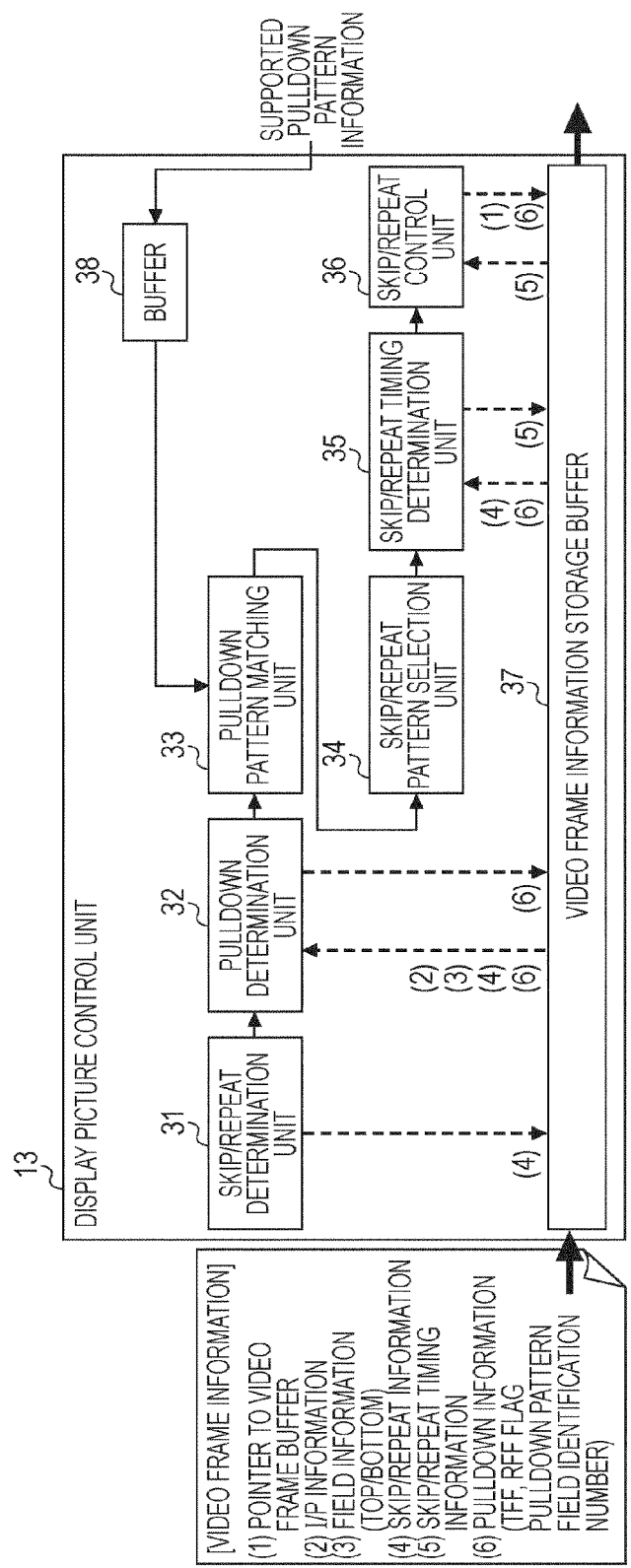
FIG. 6 is a view that shows the detailed configuration of a display picture control unit.

FIG. 6 is a view that shows an example of the detailed configuration of the display picture control unit 13.

As shown in FIG. 6, the display picture control unit 13 includes a skip/repeat determination unit 31, a pulldown determination unit 32, and a pulldown pattern matching unit 33, a skip/repeat pattern selection unit 34, a skip/repeat timing determination unit 35, a skip/repeat control unit 36, a video frame information storage buffer 37, and a buffer 38.

Note that in FIG. 6, the solid arrows that respectively connect the skip/repeat determination unit 31 through the skip/repeat control unit 36 mean the flow of processes or data in a display picture control process executed by the display picture control unit 13. In addition, the dotted arrows that respectively connect the skip/repeat determination unit 31, the pulldown determination unit 32, the pulldown pattern matching unit 33, the skip/repeat timing determination unit 35 and the skip/repeat control unit 36 to the video frame information storage buffer 37 (however, the dotted arrow from the pulldown pattern matching unit 33 is omitted) mean that each block loads or writes the video frame information stored in the video frame information storage buffer 37.

That is, the video frame information storage buffer 37 stores (1) pointer to the video frame buffer through (6) pulldown information, and various processes using those pieces of video frame information are executed where necessary.

Hereinafter, the blocks that execute the display picture control process executed by the display picture control unit 13 will be described in accordance with the flow of the process.

The skip/repeat determination unit 31 executes a skip/repeat determination process.

Here, the skip/repeat determination process determines whether, because of frame rate conversion, decode error, or the like, it may be necessary to repeatedly display the video signal 1 of the decoded picture or it may be necessary to display the video signal 1 by partially skipping the video signal 1. The skip/repeat determination unit 31 stores the determination result of skip or repeat in the video frame information storage buffer 37 as (4) skip/repeat information of the video frame information (display control information).

The pulldown determination unit 32, when (4) skip/repeat information determined by the skip/repeat determination unit 31 indicates that it may be necessary to perform skip or repeat, determines, on the basis of the decoded picture information ((2) I/P information, (3) field information, and (6) pulldown information) from among the video frame information stored in the video frame information storage buffer 37, whether the video signal 1 output from the decoder 11 is a pulldown signal.

The pulldown determination unit 32, when the video signal 1 determines that the video signal 1 is a pulldown signal, determines the pattern of the pulldown signal output from the decoder 11. For example, the pulldown determination unit 32 determines whether the pulldown signal from the decoder 11 is a 3:2 pulldown signal, a 2:2 pulldown signal, or the other pulldown signal. In addition, the pulldown determination unit 32 also determines which number the field is placed in the determined pulldown pattern.

Then, the pulldown determination unit 32 stores those determination results in the video frame information storage buffer 37 as (6) pulldown information of the video frame information (display picture control information).

The pulldown pattern matching unit 33 determines, on the basis of the display picture control information ((4) skip/repeat information) from among the video frame information stored in the video frame information storage buffer 37, whether the video signal 1 is skipped or repeated.

Then, the pulldown pattern matching unit 33, when the determination result of skip or repeat is determined as skip, executes matching between all the pulldown patterns that allow conversion by partially skipping the pulldown pattern of the video signal 1 output from the decoder 11 and the supported pulldown pattern information stored in the buffer 38. Note that the buffer 38 stores the supported pulldown pattern information from the I/P conversion unit 14.

On the other hand, the pulldown pattern matching unit 33, when the determination result of skip or repeat is determined as repeat, executes matching between all the pulldown patterns that allow conversion by repeating the pulldown pattern of the video signal 1 output from the decoder 11 and the supported pulldown pattern information stored in the buffer 38.

Note that the above all pulldown patterns are pulldown patterns, to which the front end can reduce, that is, for example, finite pulldown patterns, such as a 5:2 pattern, a 3:4 pattern, a 4:3 pattern, . . . , for example.

The pulldown pattern matching unit 33 supplies the matched pulldown pattern(s) obtained through matching to the skip/repeat pattern selection unit 34.

The skip/repeat pattern selection unit 34 selects a reducing pulldown pattern, with which the video signal 1 is reduced by skip or repeat, from among the matched pulldown pattern(s) supplied from the pulldown pattern matching unit 33.

Here, the reducing pulldown pattern is appropriately selected from among the matched pulldown patterns, and, for example, when only one pattern is matched through matching, that pattern will be the reducing pulldown pattern. Similarly, when a plurality of patterns are obtained through matching or when no matched pattern is obtained as well, an appropriate pulldown pattern is selected as the reducing pulldown pattern.

The skip/repeat pattern selection unit 34 supplies the selected reducing pulldown pattern to the skip/repeat timing determination unit 35.

The skip/repeat timing determination unit 35 determines, on the basis of the reducing pulldown pattern from the skip/repeat pattern selection unit 34 and the display picture control information ((4) skip/repeat information and the pulldown pattern field identification number of (6) pulldown information) stored in the video frame information, whether it is the timing at which skip or repeat is performed.

The skip/repeat timing determination unit 35 stores the determination result of the timing of skip or repeat in the video frame information storage buffer 37 as (5) skip/repeat timing information of the video frame information (display picture control information).

The skip/repeat control unit 36 acquires the display picture control information ((5) skip/repeat timing information) from among the video frame information stored in the video frame information storage buffer 37. The skip/repeat control unit 36, when it is the timing of skip or repeat on the basis of (5) skip/repeat timing information, updates (1) pointer to the video frame buffer and stores it in the video frame information storage buffer 37 together with (6) pulldown information.

After that, the I/P conversion unit 14 acquires the video frame information ((1) pointer to the video frame information) stored in the video frame information storage buffer 37, and loads the video signal 2 from the video frame buffer 12 on the basis of (1) pointer to the video frame buffer. The I/P conversion unit 14 converts the video signal 2, which is an interlaced signal, into a progressive signal on the basis of the video frame information 2 stored in the video frame information storage buffer 37 and the pulldown detected result from the pulldown detection unit 21, and then outputs the video signal 3 to the output buffer 15.

The display picture control unit 13 is thus configured.

Next, a video signal process executed by the video signal processing apparatus 1 shown in FIG. 5 will be described with reference to the flowchart of FIG. 7.

Note that in the video signal process shown in the flowchart of FIG. 7, in order to specifically describe the content of the process, the process will be described on the assumption that encoded data input to the decoder 11 are obtained by encoding a 3:2 pulldown-processed 59.94 Hz interlaced signal through an encoding method in conformity with MPEG2, and the encoded data include pulldown information, such as TFF and RFF.

In addition, the I/P conversion unit 14 is able to recognize a 3:2 pulldown signal and a 3:4 pulldown signal, and it is assumed that the I/P conversion unit 14 is able to completely restore a non-pulldown-processed progressive picture without a mixed picture when it is the recognizable pulldown signal.

In step S11, the decoder 11 extracts picture forming information, which may be necessary for the decoding process, from encoded data to which a picture signal is compressed and analyzes the extracted picture forming information, and then decodes the encoded data to a video signal on the basis of the analysis result of the picture forming information.

When the obtained video signal 1 decoded by the decoder 11 is output to the video frame buffer 12, in step S12, the video frame buffer 12 stores the video signal 1 output from the decoder 11.

In addition, the decoder 11 adds the address of the video frame buffer 12 that stores the video signal 1 and portion of the analysis result of the picture forming information in the video frame information 1 as decoded picture information, and supplies the decoded picture information to the display picture control unit 13.

In step S13, the I/P conversion unit 14 outputs the supported pulldown pattern information, which indicates to support, for example, a 3:2 pulldown pattern and a 3:4 pulldown pattern, to the display picture control unit 13.

In step S14, the display picture control unit 13 executes a display picture control process that determines the video signal 2 supplied to the I/P conversion unit 14 on the basis of the video frame information 1 from the decoder 11 and the supported pulldown pattern information from the I/P conversion unit 14.

Here, the detail of the display picture control process, which corresponds to the process in step S14 of FIG. 7, executed by the display picture control unit 13 shown in FIG. 6 will be described with reference to the flowchart of FIG. 8.

The skip/repeat determination unit 31, in step S31, executes a skip/repeat determination process and, in step S32, determines, on the basis of the above determination result, whether it may be necessary to skip or repeat.

In step S32, when it is determined that it is not necessary to skip or repeat, it is not necessary to execute a process for skip or repeat, so the process skips step S33 through step S44, which will be described later, and proceeds to step S45.

On the other hand, in step S32, when it is determined that it may be necessary to skip or repeat, in step S33, the pulldown determination unit 32 acquires pulldown information, such as a TFF flag and an RFF flag, stored in the video frame information 1 input from the decoder 11.

Figure 9:
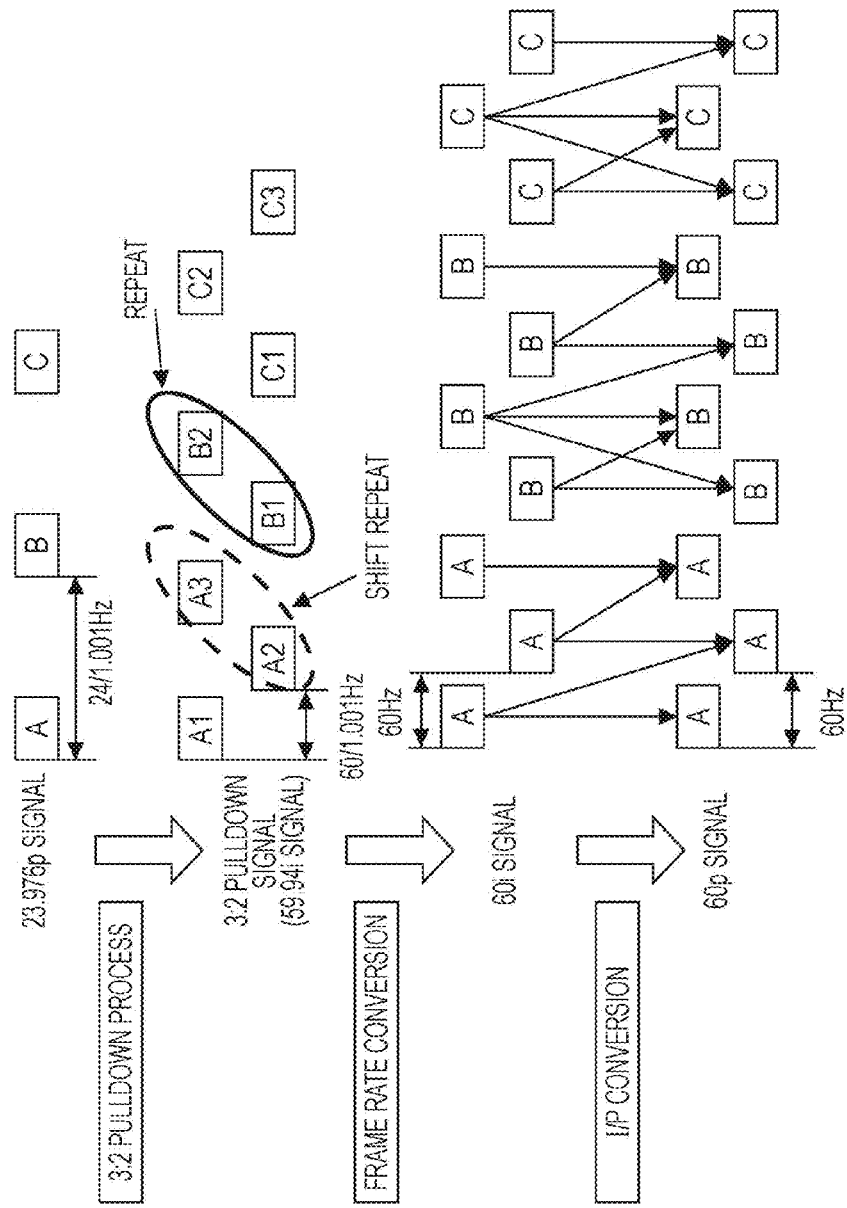
FIG. 9 is a view that illustrates a result of the process.

For example, as shown in FIG. 9, when the output after being subjected to the pulldown process of the decoder 11 corresponds to a frame indicated by a video signal A3 surrounded by the dotted line in the drawing among a 3:2 pulldown signal (59.94i signal) that is obtained by performing a 3:2 pulldown process on a 23.976p signal, it is determined as repeat by the skip/repeat determination unit 31. In this case, the pulldown determination unit 32 acquires a TFF flag and an RFF flag stored in the video frame information storage buffer 37.

Figure 8:
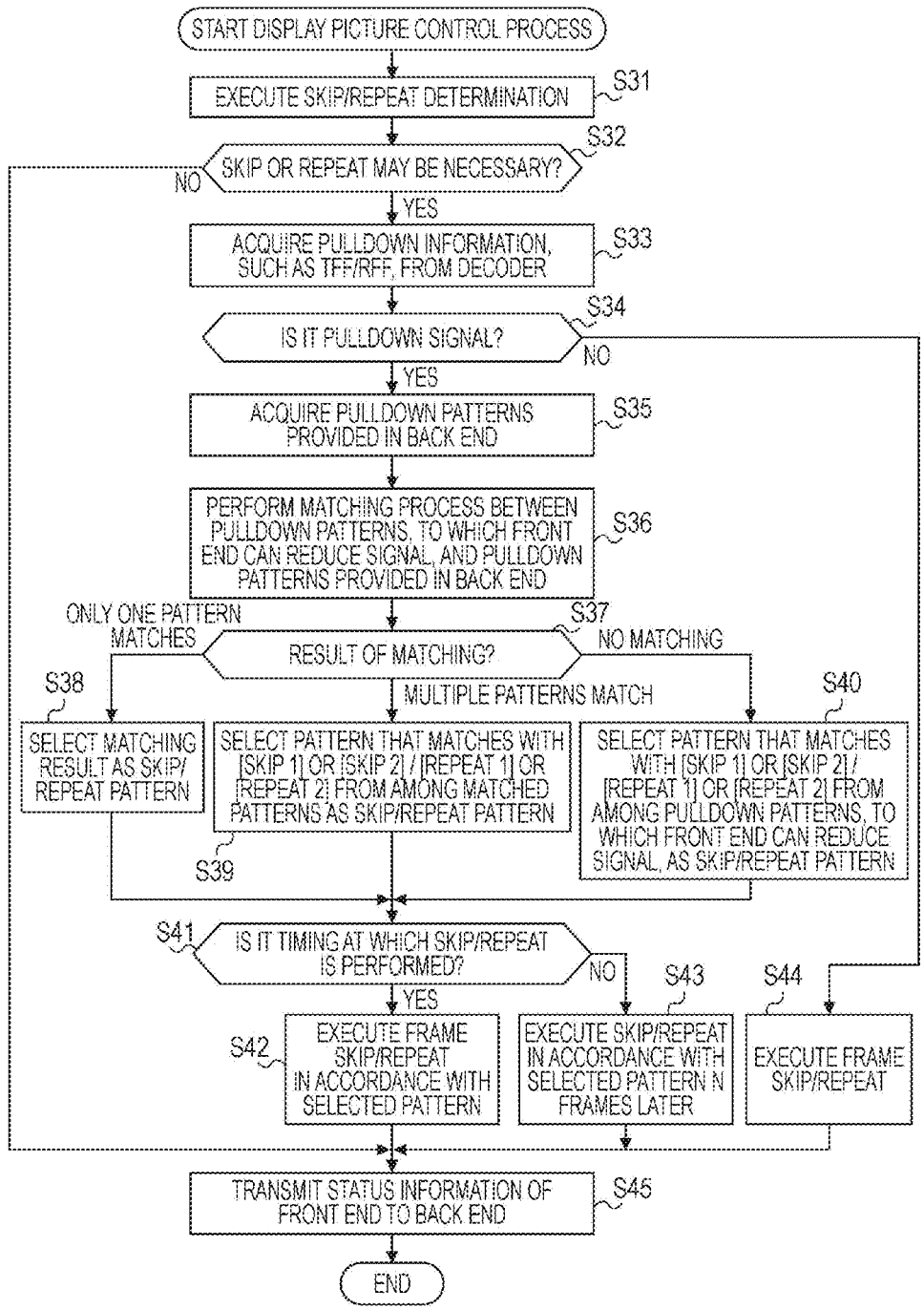
FIG. 8 is a flowchart that illustrates a display picture control process executed by the display picture control unit shown in FIG. 6.

Referring back to the flowchart of FIG. 8, in step S34, the pulldown determination unit 32 determines, on the basis of the decoded picture information among the video frame information stored in the video frame information storage buffer 37, whether the video signal 1 output from the decoder 11 is a pulldown signal.

In step S34, when it is determined that the video signal 1 output from the decoder 11 is not a pulldown signal, it is not necessary to execute a process for skip or repeat, so the process proceeds to step S44.

On the other hand, in step S34, when it is determined as a pulldown signal, in step S35, the pulldown pattern matching unit 33 acquires pulldown patterns provided in the back end, that is, the supported pulldown pattern information output from the I/P conversion unit 14 and stored in the buffer 38.

For example, when the output after being subjected to the pulldown process of the decoder 11 is a frame indicated by the video signal A3 in FIG. 9, it is determined as a pulldown signal by the pulldown determination unit 32. Then, the pulldown pattern matching unit 33 acquires the supported pulldown pattern information output from the I/P conversion unit 14 and stored in the buffer 38. The supported pulldown pattern information indicates to support the 3:2 pulldown pattern and the 3:4 pulldown pattern.

Referring back to the flowchart of FIG. 8, in step S36, the pulldown pattern matching unit 33 executes matching between the pulldown patterns, to which the front end can reduce, with the pulldown patterns provided in the back end. Then, in step S37, a branch process based on the result of the matching will be executed.

For example, as shown in FIG. 9, when a 3:2 pulldown-processed signal is repeated by the decoder 11, the repeat pattern may be conceivably finite repeat patterns, such as a 5:2 pattern, a 3:4 pattern, a 4:3 pattern, . . . , for example. The pulldown pattern matching unit 33 executes matching between these finite repeat patterns and the supported pulldown pattern information of the I/P conversion unit 14. Then, the result of matching in this case, for example, provides the 3:4 pattern.

Referring back to the flowchart of FIG. 8, in step S37, when it is determined that only one pattern matches as a matching result, in step S38, the skip/repeat pattern selection unit 34 selects the only matched skip/repeat pattern as a skip/repeat pattern.

For example, when only a 3:4 pattern is obtained as a matching result, the skip/repeat pattern selection unit 34 selects the 3:4 pattern as a repeat pattern.

On the other hand, in step S37, when it is determined that multiple patterns match as a result of matching, the process proceeds to step S39.

In step S39, the skip/repeat pattern selection unit 34 selects a pattern that coincides with [Skip 1] or [Skip 2], which will be described later, from among the multiple matched patterns as a skip/repeat pattern for skip. In addition, the skip/repeat pattern selection unit 34 selects a pattern that coincides with [Repeat 1] or [Repeat 2], which will be described later, from among the multiple matched patterns for repeat.

Here, [Skip 1], [Skip 2], [Repeat 1] and [Repeat 2] are, for example, defined to have the following content.

[Skip 1]

When the decoded video signal 1 is a p:q pulldown signal (where p≥2, q≥2), and one frame may be necessary to skip for output at the time when the frame rate of the p:q pulldown signal is converted, between p-repeat fields (hereinafter, referred to as p sequence) and q-repeat fields (referred to as q sequence), one frame is skipped for output from the frame in the sequence having the larger number of repeats.

[Skip 2]

When the decoded video signal 1 is a p:q pulldown signal (where p=q≥2), and one frame may be necessary to skip for output at the time when the frame rate of the p:q pulldown signal is converted, two fields are respectively skipped for output from the p sequence and the q sequence or the q sequence and the p sequence.

[Repeat 1]

When the decoded video signal 1 is a p:q pulldown signal (where p≥2, q≥2), and one frame may be necessary to repeat for output at the time when the frame rate of the p:q pulldown signal is converted, between the p sequence and the q sequence, one frame of the sequence having the smaller number of repeats is repeated for output.

[Repeat 2]

When the decoded video signal 1 is a p:q pulldown signal (where p=q≥2), and one frame may be necessary to repeat for output at the time when the frame rate of the p:q pulldown signal is converted, two fields are respectively repeated for output in the p sequence and the q sequence or in the q sequence and the p sequence.

As described above, [Skip 1] through [Repeat 2] are defined.

Referring back to the flowchart of FIG. 8, in step S37, when it is determined that none of patterns are matched as a result of matching, the process proceeds to step S40.

In step S40, the skip/repeat pattern selection unit 34 selects a pattern that coincides with [Skip 1] or [Skip 2] from among the pulldown patterns, to which the front end can reduce, as a skip/repeat pattern for skip. On the other hand, the skip/repeat pattern selection unit 34 selects a pattern that coincides with [Repeat 1] or [Repeat 2] from among the pulldown patterns, to which the front end can reduce, for repeat.

After that, when any one of the processes in step S38 through step S40 ends, the process proceeds to step S41.

In step S41, the skip/repeat timing determination unit 35 determines, on the basis of the pulldown pattern field identification information of (6) pulldown information stored in the video frame information storage buffer 37, whether it is the timing at which skip or repeat is performed, that is, it is the timing at which skip or repeat is performed.

In step S41, when it is determined that it is the timing at which skip or repeat is performed, in step S42, the skip/repeat control unit 36 executes skip or repeat of the frame (field) in accordance with the selected pattern. That is, in this case, the skip/repeat control unit 36 immediately executes a skip/repeat process.

On the other hand, in step S41, when it is determined that it is not the timing at which skip or repeat is performed, in step S43, the skip/repeat control unit 36 executes skip or repeat in accordance with the selected pattern N frames (fields) later. That is, in this case, after waiting until it is instructed at the timing of skip or repeat, the skip/repeat control unit 36 executes the skip/repeat process.

For example, as shown in FIG. 9, now, it is assumed that the current field is a video signal A3, and, in order to obtain a 3:4 pattern, a video signal B1 and a video signal B2 may be necessarily repeated after the video signal B2 indicated by "Repeat" in the drawing. For this reason, the current field, that is, the video signal A3, is determined that it is not a repeat timing. After that, until the video signal B2 at which it is determined to be a repeat timing, the two-field repeat process is postponed. In other words, at the video signal A2 and the video signal A3 surrounded by the dotted line in the drawing, repeat is shifted.

After that, when the current field is the video signal B2, the skip/repeat timing determination unit 35 determines that it is a repeat timing. Then, when it reaches the repeat timing of the video signal B2, the skip/repeat control unit 36 adjusts the pointer to the video frame buffer 12 so that the video signal B1 and the video signal B2 are repeated. By so doing, the repeat process of the video signal B1 and the video signal B2 is executed.

Referring back to the flowchart of FIG. 8, when, in step S34, it is determined that the video signal 1 output from the decoder 11 is not a pulldown signal, in step S44, the skip/repeat control unit 36 executes a process of skipping or repeating a frame (field). That is, in this case, it may be not necessary to execute a process for skip or repeat, the skip/repeat control unit 36 executes a skip/repeat process without taking into consideration a pulldown signal.

When any one of the processes in step S42 through step S44 ends, the process proceeds to step S45.

In step S45, any one of the skip/repeat determination unit 31 through the skip/repeat control unit 36 transmits the status information of the front end to the following back end by storing the status information in the video frame information storage buffer 37.

Here, the status information, for example, includes information, such as the skip/repeat information, the matched pattern(s) and the presence or absence of a special reproduction, which may be necessary to execute a back end process, such as I/P conversion or high frame rate conversion, executed in the back end.

For example, when the repeat process is executed, the skip/repeat control unit 36 updates (6) pulldown information of the video frame information stored in the video frame information storage buffer 37 to information that indicates that a signal is temporarily converted into a 3:4 pulldown signal through the repeat process. Then, the updated video frame information is transmitted as the state information (video frame information 2) to the I/P conversion unit 14, which serves as the back end.

Figure 7:
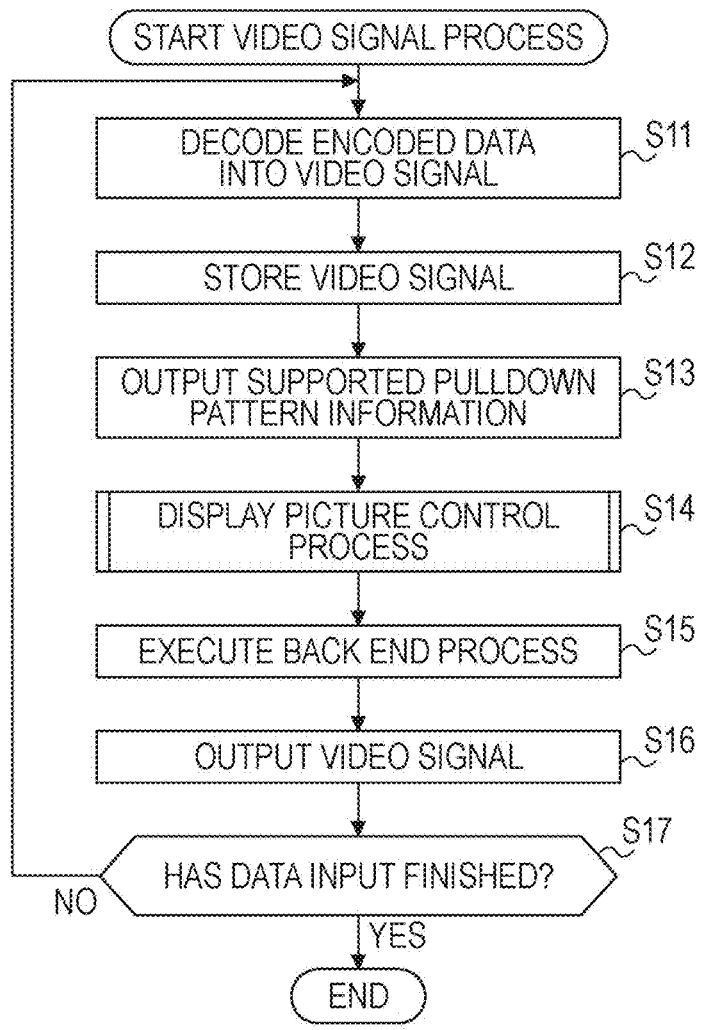
FIG. 7 is a flowchart that illustrates a video signal process executed by the video signal processing apparatus shown in FIG. 5.

When the process in step S45 ends, the display picture control process executed by the display picture control unit 13 ends, and, after that, the process returns to the process in step S15 shown in FIG. 7.

In step S15, the I/P conversion unit 14 executes the back end process, such as I/P conversion or high frame rate conversion.

Specifically, the I/P conversion unit 14 acquires the video signal 2 from among the video signal 1 stored in the video frame buffer 12 on the basis of the video frame information 2 acquired through the display picture control process executed by the display picture control unit 13. Then, the I/P conversion unit 14, when the acquired video signal 2 is an interlaced picture, converts the video signal 2 into a progressive picture on the basis of the video frame information 2.

That is, at this time, the I/P conversion unit 14 is able to recognize that, for example, a 3:2 pulldown signal is temporarily input as a 3:4 pulldown signal on the basis of the status information (video frame information 2) transmitted from the front end. As a result, the I/P conversion unit 14 is able to generate a complete progressive picture without any fields having different capturing times as shown by a 60p signal that is obtained by performing I/P conversion on a 60i signal in FIG. 9.

The I/P conversion unit 14 outputs the video signal, which is obtained by converting the video signal 2 into a progressive picture, to the output buffer 15 as the video signal 3.

In step S16, the output buffer 15 stores the video signal 3 from the I/P conversion unit 14 and outputs it as the video signal 4.

In step S17, the front end determines whether encoded data input has finished. In step S17, when it is determined that encoded data input has not finished, the process returns to step S11 and repeats the processes in the above described step S11 through step S17 to execute the video signal process.

On the other hand, in step S17, when it is determined that encoded data input has finished, the video signal process ends.

In this manner, the video signal process is executed by the video signal processing apparatus 1 shown in FIG. 5.

In this way, the video signal processing apparatus 1, when an input signal is a pulldown signal and a frame (field) skip or repeat is performed on the pulldown signal because of frame rate conversion, is able to temporarily convert the input to the I/P conversion unit 14 into another pulldown signal supported by the I/P conversion unit 14. Thus, when repeat is performed, the I/P conversion unit 14 copies adjacent inverted fields to make it possible to restore a complete progressive picture, not an interpolated picture through prediction between fields.

In addition, when skip is performed, as in the case of the repeat, the I/P conversion unit 14 copies adjacent inverted fields to restore a complete progressive picture or, even when an interpolated picture through prediction between fields is created because it is difficult to copy adjacent inverted fields, the I/P conversion unit 14 performs skip so as to prevent a frame omission from a signal prior to a pulldown process, so the amount of information for creating the interpolated picture is increased as compared with the case in which I/P conversion is performed without taking into consideration of pulldown, thus creating a further smooth interpolated picture.

Furthermore, the I/P conversion unit 14 is able to create an inverted-field picture by copying one field, so a memory access is reduced as compared with an interpolated picture created through prediction between fields.

In addition, it is possible to reduce pulldown error detection in the back end by transmitting information of the video signal, output from the front end, to the back end as the status information (video frame information 2). As a result, it is possible to prevent an unintended picture from being created.

Figure 10:
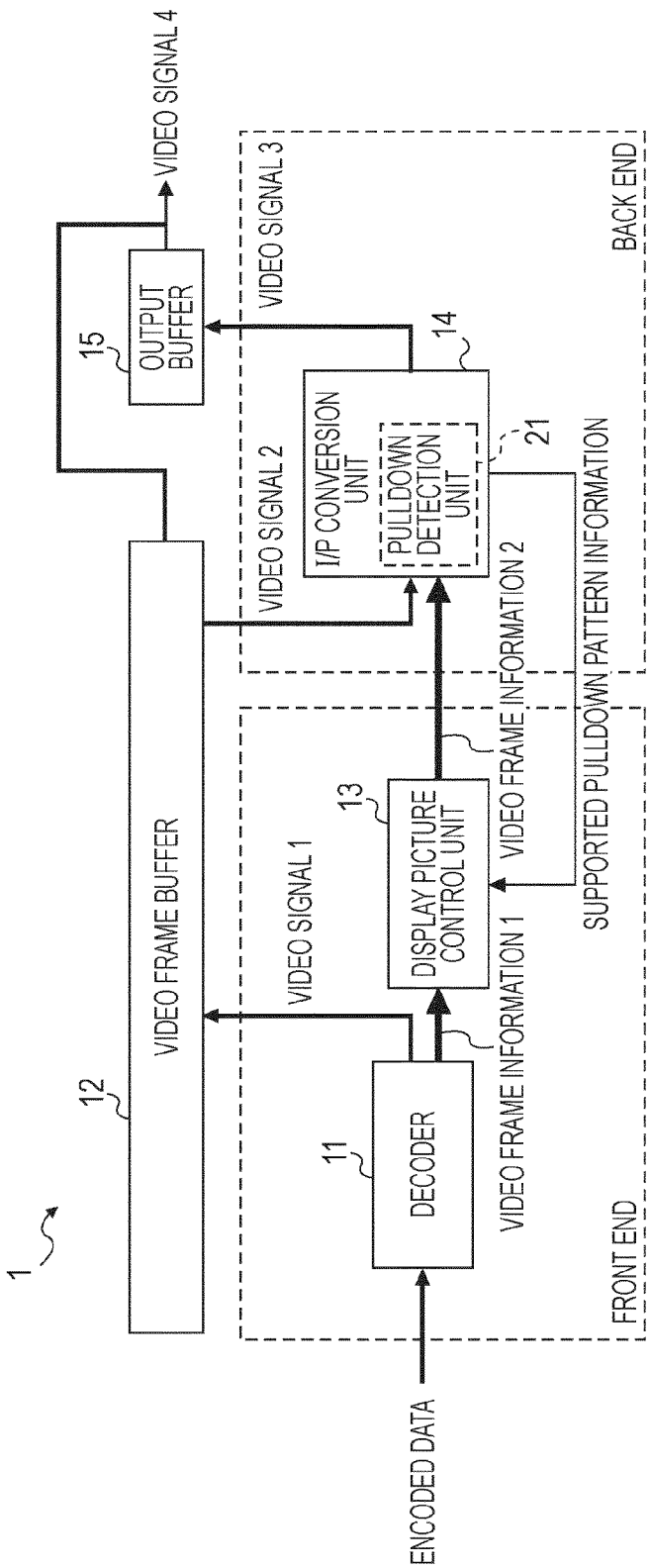
FIG. 10 is a view that shows an example of another configuration of the video signal processing apparatus shown in FIG. 5.
Figure 11:
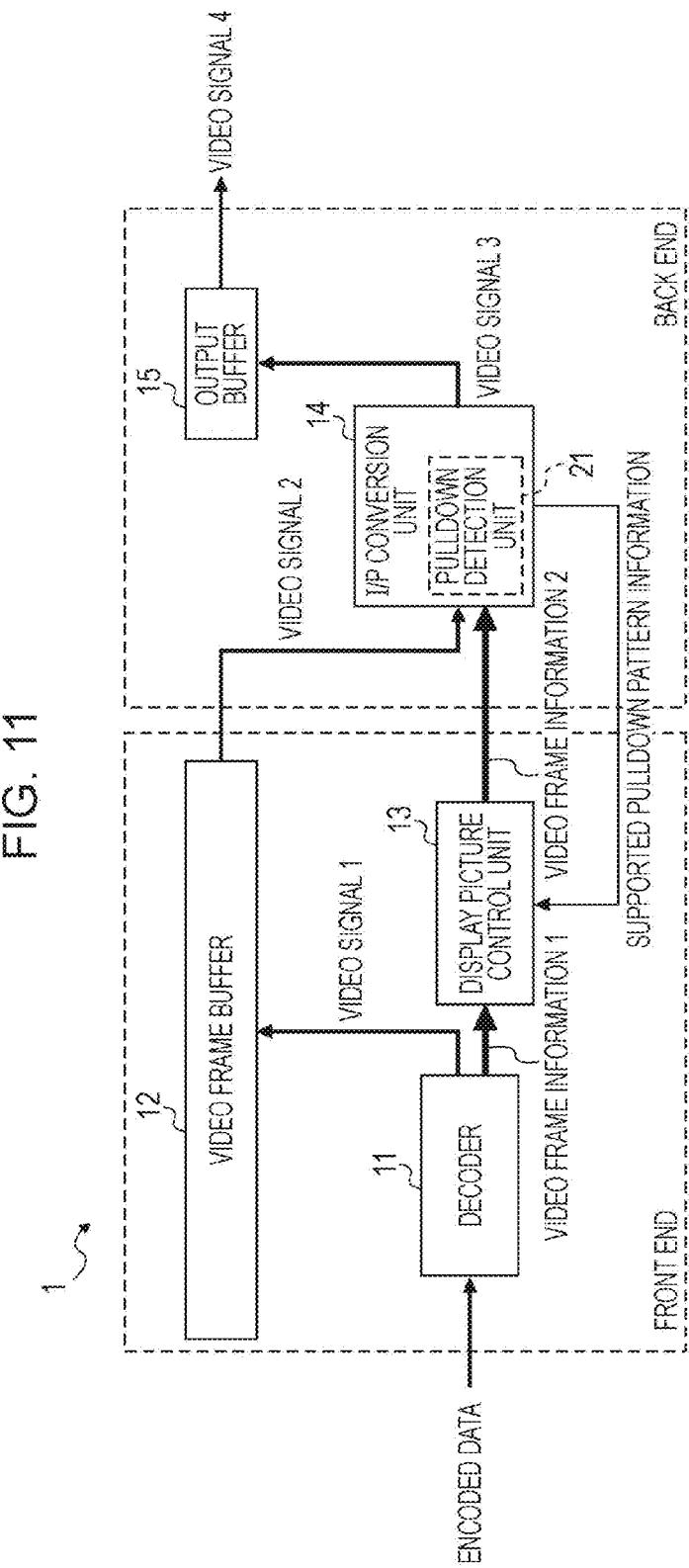
FIG. 11 is a view that shows an example of another configuration of the video signal processing apparatus shown in FIG. 5.

Note that the configuration of the video signal processing apparatus 1 shown in FIG. 5 is an example, and it may be a configuration, for example, shown in FIG. 10 or FIG. 11.

That is, in the video signal processing apparatus 1 shown in FIG. 5, the video signal 3 output from the I/P conversion unit 14 and stored in the output buffer 15 is an I/P-converted progressive video signal; instead, it is applicable that a video signal that has inverted fields of the input video signal is stored in the output buffer 15 as an output of the I/P conversion unit 14. In this case, as shown in FIG. 10, the video signal 3 output from the output buffer 15 is combined with a video signal from the video frame buffer 12 and is output to the following block as the video signal 4. Note that in the video signal processing apparatus 1 shown in FIG. 10, the other configuration is similar to that of the video signal processing apparatus 1 shown in FIG. 5.

In addition, it may also be configured so that, as shown in FIG. 11, the front end includes the video frame buffer 12, and, in addition, the back end includes the output buffer 15. In this case, in the video signal processing apparatus 1 shown in FIG. 11, the back end does not directly perform memory access to the video frame buffer 12 but acquires a video signal from the video frame buffer 12 via an interface between the front end and the back end.

Incidentally, in the display picture control unit 13, it is conceivable that, for example, in a picture signal compressed through MPEG, it is difficult to acquire pulldown information, such as TFF and RFF, from the decoder 11. In this case, as shown in the configuration example of the video signal processing apparatus 51 shown in FIG. 12, through a feedback of pulldown information detected by a pulldown detection unit 71 provided in the I/P conversion unit 14, a display picture control unit 61 is able to determine whether the input video signal is a pulldown signal.

Then, next, an example of a process of determining whether it is a pulldown signal using pulldown information that is fed back from the pulldown detection unit 71 will be described with reference to FIG. 12 to FIG. 16.

Figure 12:
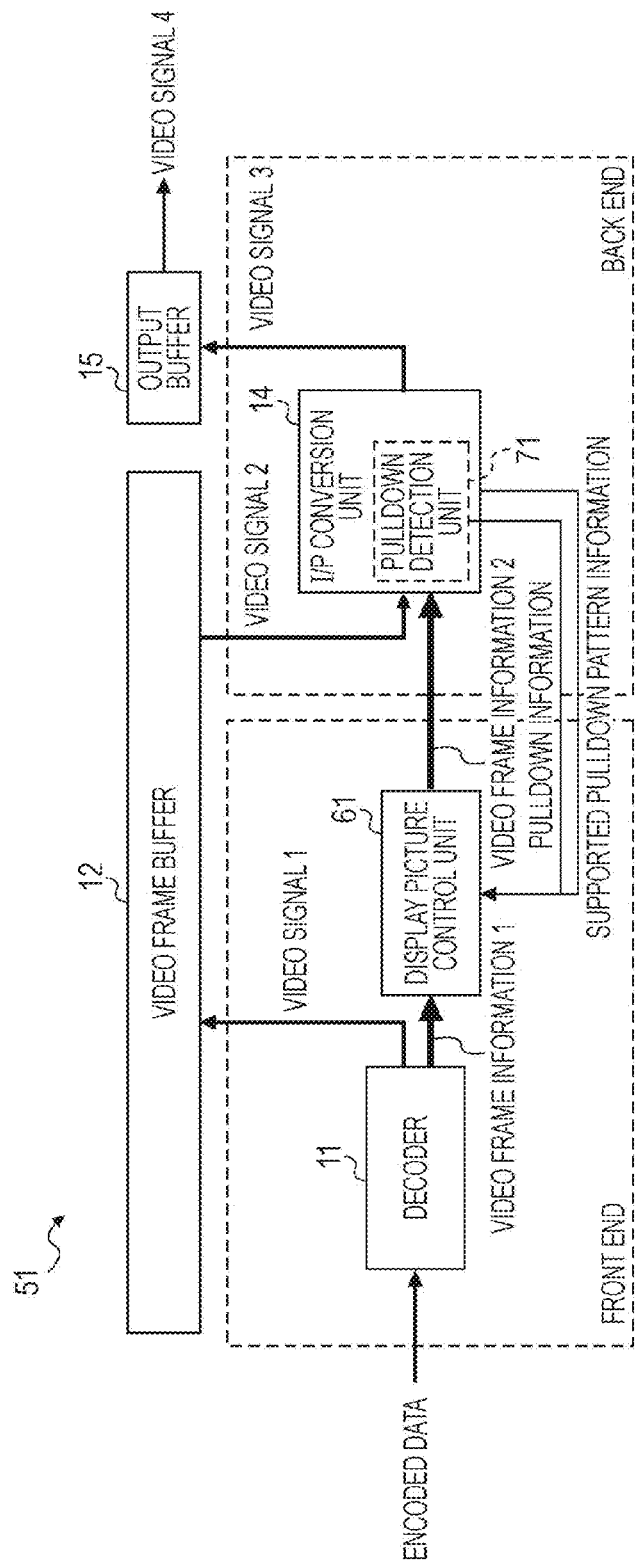
FIG. 12 is a view that shows another configuration of the embodiment of the video signal processing apparatus to which the invention is applied.
Figure 13:
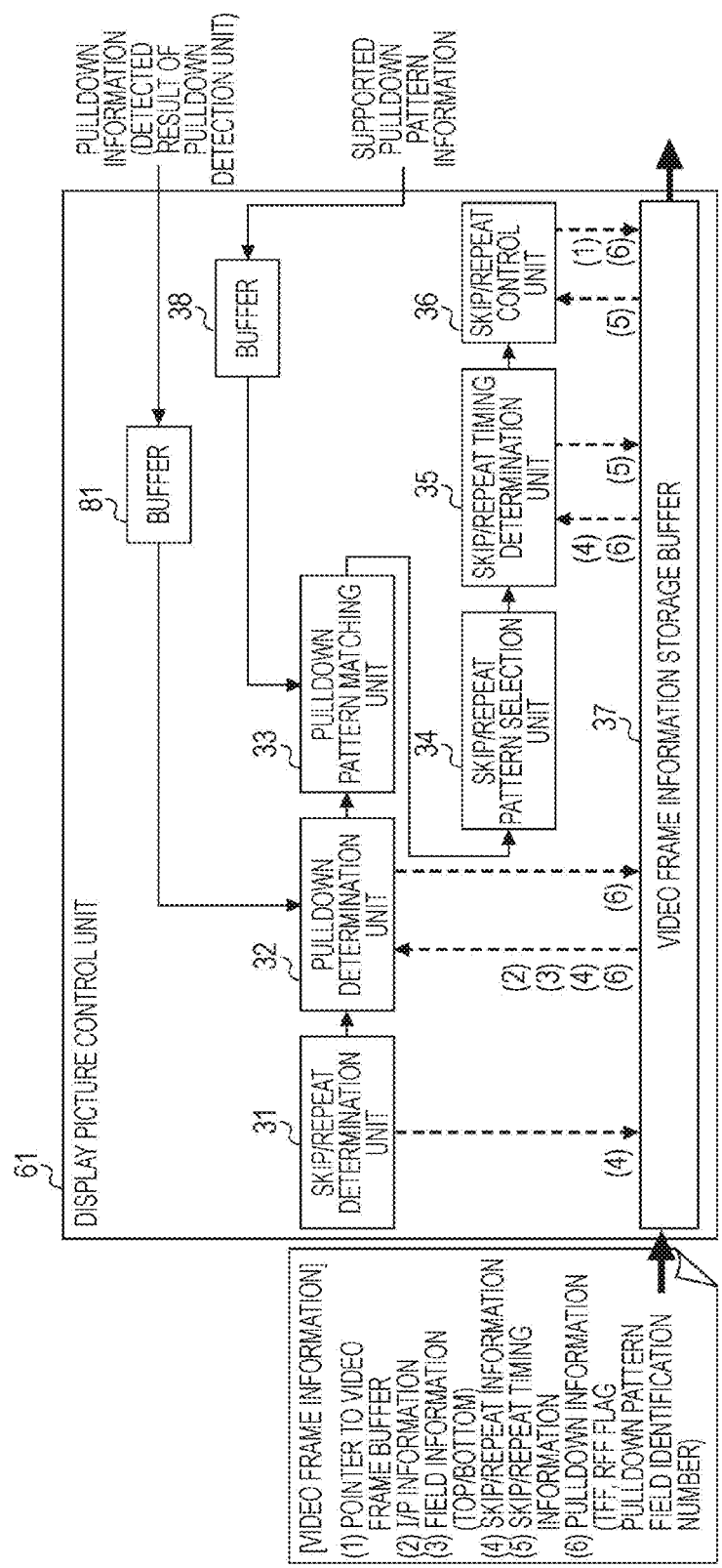
FIG. 13 is a view that shows another detailed configuration of the display picture control unit.

Note that in FIG. 12 and FIG. 13, like reference numerals denote like components to those in FIG. 5 and FIG. 6, and the description regarding similarly processed portions will not be repeated. In this example, instead of the display picture control unit 13 and pulldown detection unit 21 shown in FIG. 5, the display picture control unit 61 and the pulldown detection unit 71 are provided.

The pulldown detection unit 71 analyzes a frame differential signal of the video signal 2 input from the video frame buffer 12 to the I/P conversion unit 14 and determines and detects whether the input video signal 2 is a pulldown signal. The pulldown detection unit 71 feeds the detected result of the pulldown signal back to the display picture control unit 61 as pulldown information.

The display picture control unit 61 determines, on the basis of the pulldown information fed back from the pulldown detection unit 71, whether the input video signal is a pulldown signal.

Specifically, as shown in FIG. 13, the display picture control unit 61 additionally includes a buffer 81 that stores the pulldown information that is fed back from the pulldown detection unit 71 as compared with the display picture control unit 13 shown in FIG. 6. In FIG. 13, the pulldown determination unit 32 determines, on the basis of the pulldown information stored in the buffer 81, whether the video signal 1 output from the decoder 11 is a pulldown signal. The pulldown determination unit 32 stores the determination result in the video frame information storage buffer 37 as (6) pulldown information of the video frame information (display picture control information).

Note that in FIG. 12 and FIG. 13, the other configuration is similar to that shown in FIG. 5 and FIG. 6.

Next, the video signal process executed by the video signal processing apparatus 1 shown in FIG. 12 will be described with reference to the flowchart of FIG. 14.

In step S51 and step S52, as in the case of step S11 and step S12 in FIG. 7, a front end process, such as a process in which the front end decodes encoded data into a video signal, is executed.

In step S53, the I/P conversion unit 14 outputs the supported pulldown pattern information to the display picture control unit 61, and the pulldown detection unit 71 outputs the pulldown information to the display picture control unit 61.

In step S54, the display picture control unit 61 executes the display picture control process, which is a process to determine the video signal 2 supplied to the I/P conversion unit 14, on the basis of the video frame information 1 from the decoder 11, the supported pulldown pattern information from the I/P conversion unit 14, and the pulldown information from the pulldown detection unit 71.

Here, the detail of the display picture control process, which is executed by the display picture control unit 61 shown in FIG. 13 and corresponds to the process in step S54 of FIG. 14, will be described.

In the processes in step S71 and step S72, as in the case of step S31 and step S32 in FIG. 8, the skip/repeat determination unit 31 executes the skip/repeat determination process.

Through the skip/repeat determination process, when it is determined that it may be necessary to skip or repeat, in step S73, the pulldown determination unit 32 determines whether the pulldown information may be acquired from the decoder 11.

In step S73, when it is determined that the pulldown information may be acquired from the decoder 11, in step S74, the pulldown determination unit 32 acquires the pulldown information, such as a TFF flag and an RFF flag, input from the decoder 11 and stored in the video frame information 1.

On the other hand, in step S73, when it is determined that it is difficult to acquire the pulldown information from the decoder 11, in step S75, the pulldown determination unit 32 acquires the pulldown information, stored in the buffer 81, from the back end (pulldown detection unit 71). That is, the pulldown information is fed back from the pulldown detection unit 71, and includes information corresponding to, for example, a progressive sequence, a TFF flag, and an RFF flag.

Then, in step S76, as in the case of the process in step S34 in FIG. 8, the pulldown determination unit 32 determines, using the pulldown information acquired through the process in step S74 and step S75, whether it is a pulldown signal.

In the processes of step S77 through step S87, as in the case in step S35 through step S45 in FIG. 8, the pulldown determination unit 32 through the skip/repeat control unit 36 execute a process of skipping or repeating a frame in accordance with the matched pattern.

Figure 14:
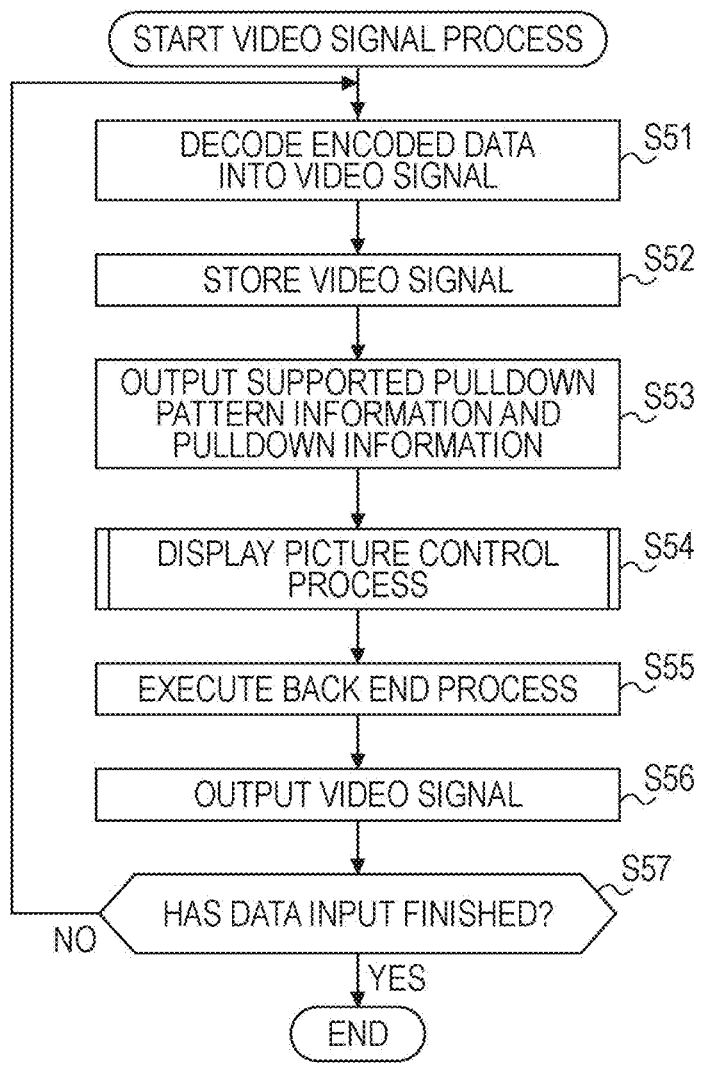
FIG. 14 is a flowchart that illustrates a video signal process executed by the video signal processing apparatus shown in FIG. 12.
Figure 15:
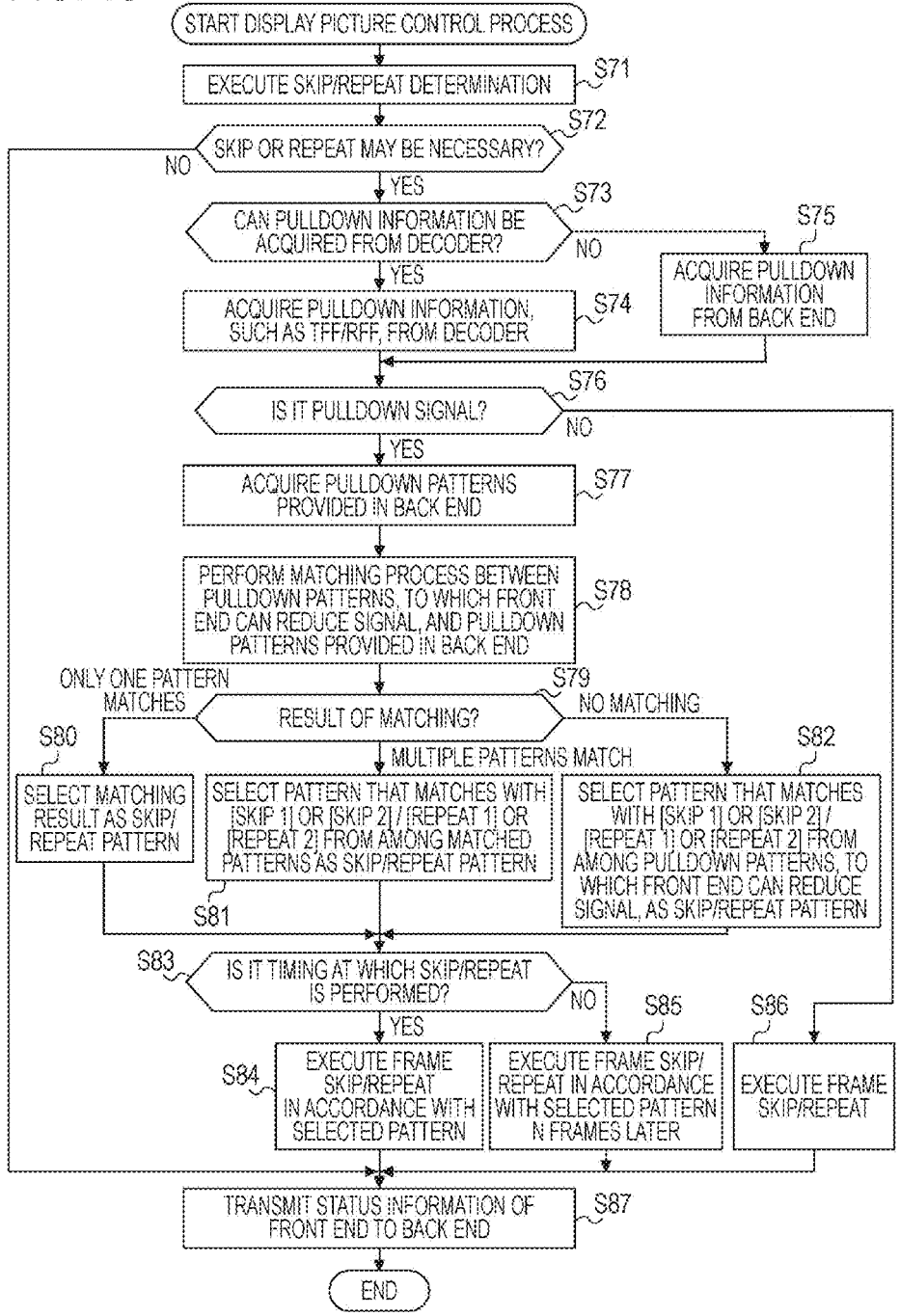
FIG. 15 is a flowchart that illustrates a display picture control process executed by the display picture control unit shown in FIG. 13.

When the process in step S87 ends, the display picture control process executed by the display picture control unit 61 ends and, after that, the process returns to step S55 in FIG. 14.

In step S55 through step S57, as in the case of step S15 through step S17 in FIG. 7, the back end process is executed by the back end and the processes in step S51 through S57 are repeated until it is determined that the encoded data input has finished in step S57.

As described above, according to the video signal processing apparatus 51, even when it is difficult to acquire the pulldown information from the decoder 11, through a feedback of the pulldown information detected by the pulldown detection unit 71, it is possible to determine whether the input video signal is a pulldown signal.

Figure 16:
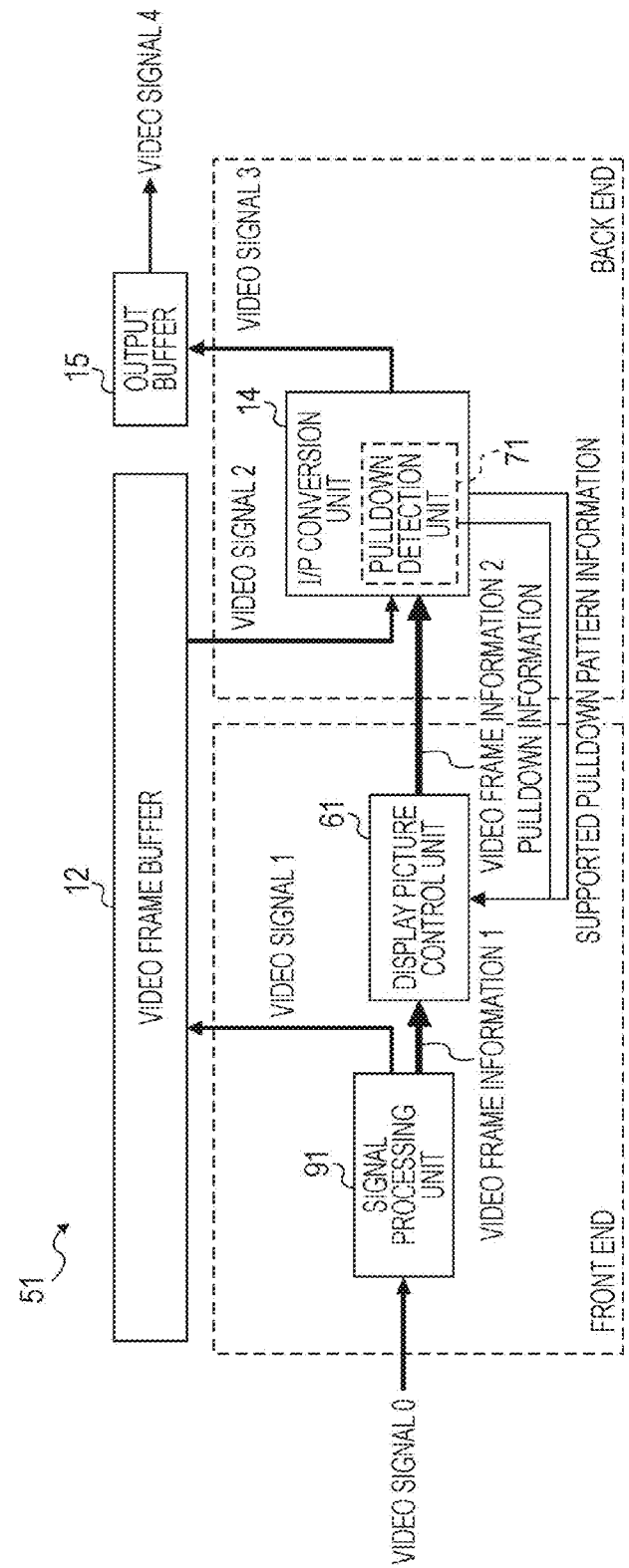
FIG. 16 is a view that shows an example of another configuration of the video signal processing apparatus shown in FIG. 12.

Note that the configuration of the video signal processing apparatus 51 shown in FIG. 12 is an example, and it may be a configuration, for example, shown in FIG. 16.

The video signal processing apparatus 51 shown in FIG. 16 includes a signal processing unit 91 instead of the decoder 11 as compared with the video signal processing apparatus 51 shown in FIG. 12, and the signal processing unit 91 receives a video signal 0. That is, because the video signal processing apparatus 51 is an example in which the pulldown information, such as TFF and RFF, may not be acquired from the decoder 11, the input to the front end is not limited to encoded data as shown in FIG. 16; instead, a video signal may be input to the front end. However, in this case, I/P information may be necessary to form data together with the video signal 0 or the signal processing unit 91 may be necessary to determine whether the video signal 0 is interlaced or progressive.

In this way, according to the embodiment of the invention, in the video signal processing apparatus that decodes a compressed video signal and executes I/P conversion on the decoded video signal, when it may be necessary to skip or repeat a frame of a pulldown-processed interlaced signal because of frame rate conversion, the front end determines a method of skipping or repeating a frame from among any one of the patterns in the supported pulldown pattern information and then executes skipping or repeating on a frame in accordance with the determined method. By so doing, even when skipping or repeating of a frame is executed by the decoder on the video signal input to the I/P conversion unit, the video signal is converted into another pulldown pattern supported by the I/P conversion unit. Thus, the I/P conversion unit is able to convert an interlaced pulldown signal into a progressive pulldown signal with less degradation.

In addition, in the related art, the input signal to the decoder is not a pulldown signal (for example, a pulldown process is performed on a 24p or 23.976p signal); still, the result obtained through skip/repeat or special reproduction may become a pulldown sequence. Thus, there is a possibility that a device at a side detecting a pulldown signal might erroneously be determined as a pulldown signal. Then, because of that erroneous determination, there is a problem that an I/P converter creates an unintended picture (creates a picture at the time of a pulldown sequence). However, by transmitting the information of a video signal output from the front end to the back end as the status information (video frame information 2), it is possible to reduce erroneous detection of pulldown in the back end and, as a result, it is possible to prevent an unintended picture from being created.

Note that in the embodiment shown in FIG. 5 or FIG. 12, the front end, the back end, the video frame buffer 12 and the output buffer 15 form the single-unit video signal processing apparatus 1 or the single-unit video signal processing apparatus 51; instead, the blocks that respectively constitute the front end and the back end may form separate devices.

The above described series of processes may be executed by hardware or may be executed by software. When the series of processes are executed by software, programs that constitute the software are installed from a program recording medium onto a computer that is assembled to exclusive hardware or, for example, a general personal computer that is able to execute various functions by installing various programs.

Figure 17:
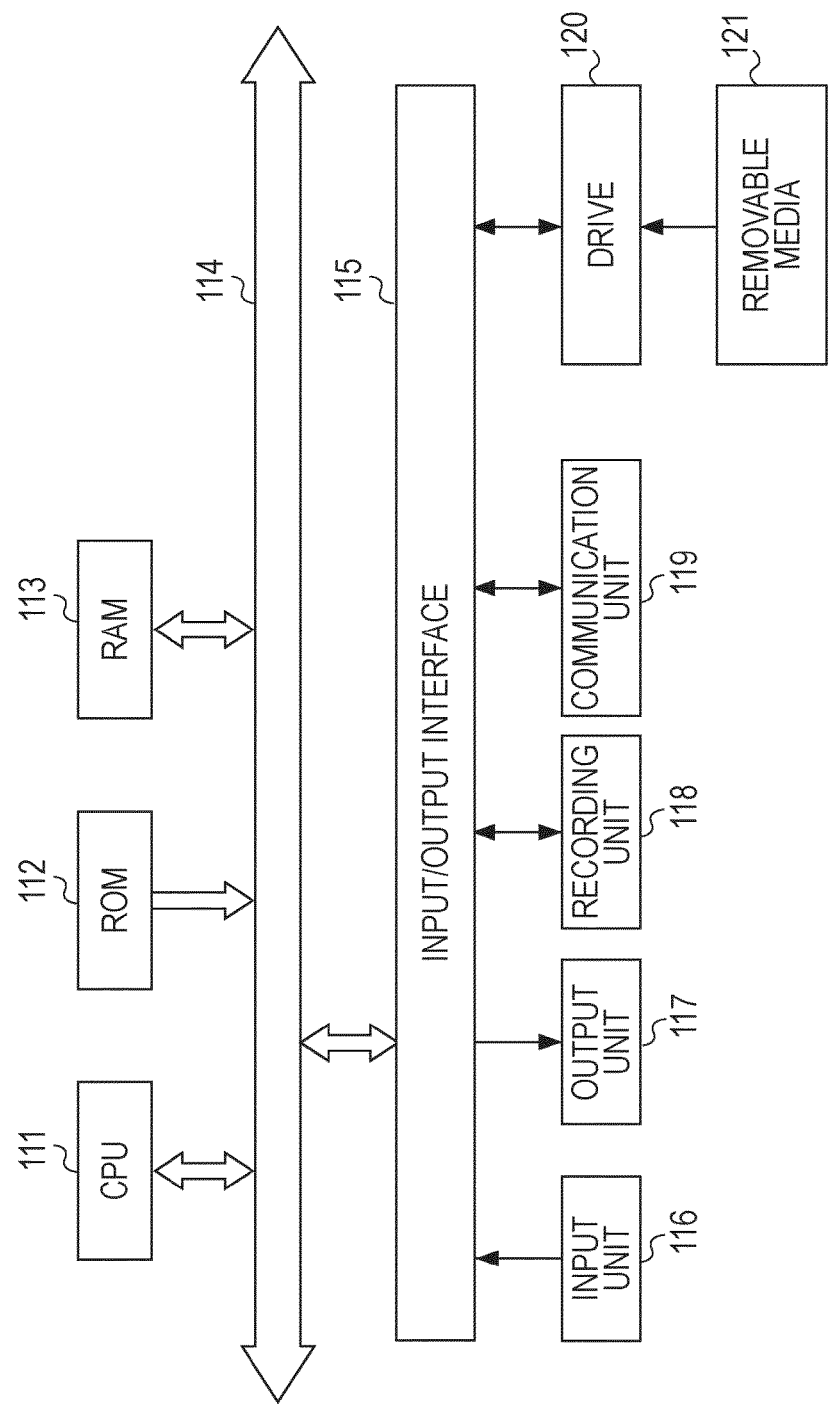
FIG. 17 is a block diagram that shows a configuration example of a computer that executes an information process, to which the invention is applied, through software.

FIG. 17 is a block diagram that shows an example of the configuration of a personal computer that executes the above described series of processes through programs. A CPU (Central Processing Unit) 111 executes various processes in accordance with programs recorded in a ROM (Read Only Memory) 112 or a recording unit 118. A RAM (Random Access Memory) 113 stores programs, data, and the like, executed by the CPU 111, where necessary. These CPU 111, ROM 112 and RAM 113 are connected via a bus 114 to one another.

An input/output interface 115 is connected to the CPU 111 via the bus 114. An input unit 116 formed of a microphone, or the like, and an output unit 117 formed of a display, a speaker, or the like, are connected to the input/output interface 115. The CPU 111 executes various processes in response to an instruction input through the input unit 116. Then, the CPU 111 outputs the result of the process to the output unit 117.

The recording unit 118 connected to the input/output interface 115 is, for example, formed of a hard disk, and records programs, executed by the CPU 111, and/or various data. The communication unit 119 communicates with an external device through a network, such as the Internet or a local area network.

In addition, a program may be acquired through the communication unit 119 and recorded in the recording unit 118.

A drive 120 is connected to the input/output interface 115. The drive 120, when loaded with a removable media 121, such as a magnetic disk, an optical disk, a magneto-optical disk or a semiconductor memory, drives it and acquires programs, data, or the like, recorded therein. The acquired programs or data are transmitted to and recorded in the recording unit 118 where necessary.

The program recording medium stores a program that is installed on a computer to be executable by the computer is formed of, as shown in FIG. 17, a magnetic disk (including a flexible disk), an optical disk (including a CD-ROM (Compact Disc-Read Only Memory) and a DVD (Digital Versatile Disc)), a magneto-optical disk, the removable media 121, which is a packaged media formed of a semiconductor memory, or the like, the ROM 112 in which a program is temporarily or permanently stored, the hard disk that constitutes the recording unit 118, or the like. Programs are stored in the program recording medium through the communication unit 119, which is an interface such as a router and a modem, where necessary using a wired or wireless communication medium, such as a local area network, the Internet, and a digital satellite broadcasting.

Note that in the specification, steps that describe a program stored in a recording medium include not only processes executed in the written order in time sequence but also processes that are executed in parallel or separately even when the processes are not executed in time sequence.

The present application contains subject matter related to that disclosed in Japanese Priority Patent Application JP 2008-100451 filed in the Japanese Patent Office on Apr. 8, 2008, the entire content of which is hereby incorporated by reference.

In addition, the embodiment of the invention is not limited to the above described embodiment and may be modified into various forms without departing from the scope of the invention. It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus having a frame buffer that stores an input video signal, wherein the information processing apparatus loads a video signal at an asynchronous timing with the video signal input from the frame buffer and performs interlaced/progressive (I/P) conversion of the loaded video signal from an interlaced signal into a progressive signal, the information processing apparatus comprising:
   pulldown determination means for determining whether the input video signal is of a pulldown type;
   matching means for identifying a plurality of resulting pulldown patterns that would result from skipping or repeating one or more frames or fields of at least a portion of the input video signal, and for comparing the plurality of resulting pulldown patterns to at least one supported pulldown pattern supported by an I/P conversion unit configured to perform the I/P conversion, the comparing comprising determining whether the plurality of resulting pulldown patterns and the at least one supported pulldown pattern include at least one matching pulldown pattern supported by the I/P conversion unit; and
   control means for controlling, in a case where the input video signal is of the pulldown type and the matching means identifies the matching pulldown pattern, a process of skipping or repeating one or more frames or fields of at least a portion of the loaded video signal to convert at least the portion of the loaded video signal to the at least one matching pulldown pattern supported by the I/P conversion unit.

2. The information processing apparatus according to claim 1, wherein the control means controls the process of skipping or repeating the loaded video signal based on a result of the comparing.

3. The information processing apparatus according to claim 2, wherein:
   the result of the comparing includes a case in which the at least one matching pulldown pattern comprises only one matching pulldown pattern, a case in which the at least one matching pulldown pattern comprises multiple matching pulldown patterns, or a case in which no matching pulldown patterns are identified, and
   the information processing apparatus further comprises selection means for selecting a pattern of skipping or repeating corresponding to the result of the comparing.

4. The information processing apparatus according to claim 3, wherein the selection means, when the at least one matching pulldown pattern comprises only one matching pulldown pattern, selects the only one matching pulldown pattern as a pattern of skipping or repeating.

5. The information processing apparatus according to claim 3, wherein the selection means, when the at least one matching pulldown pattern comprises multiple matching pulldown patterns, selects a predetermined pattern that is defined beforehand from among the multiple matching pulldown patterns as a pattern of skipping or repeating.

6. The information processing apparatus according to claim 3, wherein the selection means, when no matching pulldown patterns are identified as the result of the comparing, selects a predetermined pattern that is defined beforehand from among all pulldown patterns that would result from skipping or repeating one or more frames or fields of at least a portion of the input video signal, as a pattern of skipping or repeating.

7. The information processing apparatus according to claim 2, further comprising:
   timing determination means for determining whether it is a timing at which the process of skipping or repeating is executed on the loaded video signal,
   wherein the control means, when it is determined that it is the timing at which the process of skipping or repeating is executed on the loaded video signal, executes the process of skipping or repeating on the loaded video signal.

8. The information processing apparatus according to claim 2, wherein the pulldown determination means is for determining a pulldown pattern of the input video signal.

9. The information processing apparatus of claim 1, wherein the process is a frame-rate conversion process.

10. An information processing method for an information processing apparatus having a frame buffer that stores an input video signal, the information processing apparatus being configured to load a video signal at an asynchronous timing with the video signal input from the frame buffer and to perform interlaced/progressive (I/P) conversion of the loaded video signal from an interlaced signal into a progressive signal, the information processing method comprising:
   determining whether the input video signal is of a pulldown type;
   identifying a plurality of resulting pulldown patterns that would result from skipping or repeating one or more frames or fields of at least a portion of the input video signal;
   comparing the plurality of resulting pulldown patterns to at least one supported pulldown pattern supported by an I/P conversion unit configured to perform the I/P conversion, the comparing comprising determining whether the plurality of resulting pulldown patterns and the at least one supported pulldown pattern include at least one matching pulldown pattern supported by the I/P conversion unit; and
   controlling, in a case where the input video signal is of the pulldown type and the matching pulldown pattern is identified, a process of skipping or repeating one or more frames or fields of at least a portion of the loaded video signal to convert at least the portion of the loaded video signal to the at least one matching pulldown pattern supported by the I/P conversion unit.

11. A computer-readable hardware storage medium storing a computer-executable instructions, executable on a computer that controls an apparatus having a frame buffer that stores an input video signal, the apparatus being configured to load a video signal at an asynchronous timing with the video signal input from the frame buffer and to perform interlaced/progressive (I/P) conversion of the loaded video signal from an interlaced signal into a progressive signal, the computer-executable instructions, when executed by the computer, cause the computer to:
   determine whether the input video signal is of a pulldown type;
   identify a plurality of resulting pulldown patterns that would result from skipping or repeating one or more frames or fields of at least a portion of the input video signal;
   compare the plurality of resulting pulldown patterns to at least one supported pulldown pattern supported by an I/P conversion unit configured to perform the I/P conversion, the comparing comprising determining whether the plurality of resulting pulldown patterns and the at least one supported pulldown pattern include at least one matching pulldown pattern supported by the I/P conversion unit; and control, in a case where the input video signal is of the pulldown type and matching pulldown pattern is identified, a process of skipping or repeating one of more frames or fields of at least a portion of the loaded video signal to convert at least the portion of the loaded video signal to the at least one matching pulldown pattern supported by the I/P conversion unit.

12. An information processing apparatus having a frame buffer that stores an input video signal, wherein the information processing apparatus loads a video signal at an asynchronous timing with the video signal input from the frame buffer and performs interlaced/progressive (I/P) conversion of the loaded video signal from an interlaced signal into a progressive signal, the information processing apparatus comprising:
   a pulldown determination unit configured to determine whether the input video signal is of a pulldown type;
   a matching unit configured to identify a plurality of resulting pulldown patterns that would result from skipping or repeating one or more frames or fields of at least a portion of the input video signal, and to compare the plurality of resulting pulldown patterns to at least one supported pulldown pattern supported by an I/P conversion unit configured to perform the I/P conversion, the comparing comprising determining whether the plurality of resulting pulldown patterns and the at least one supported pulldown pattern include at least one matching pulldown pattern supported by the I/P conversion unit; and
   a control unit configured to control, in a case where the input video signal is of the pulldown type and the matching unit identifies the matching pulldown pattern, a process of skipping or repeating one or more frames or fields of at least a portion of the loaded video signal to convert at least the portion of the loaded video signal to the at least one matching pulldown pattern supported by the I/P conversion unit.

* * * * *